United States Patent
Holzmann

(10) Patent No.: US 8,335,310 B2
(45) Date of Patent: *Dec. 18, 2012

(54) METHOD AND SYSTEM FOR SUBSCRIBER LINE INTERFACE CIRCUIT HAVING A HIGH-VOLTAGE MOS LINEFEED CIRCUIT

(75) Inventor: Peter (Petrus) J. Holzmann, San Jose, CA (US)

(73) Assignee: Nuvoton Technology Corporation, Hsinchu (TW)

( * ) Notice: Subject to any disclaimer, the term of this patent is extended or adjusted under 35 U.S.C. 154(b) by 368 days.

This patent is subject to a terminal disclaimer.

(21) Appl. No.: 12/635,617

(22) Filed: Dec. 10, 2009

(65) Prior Publication Data
US 2010/0086121 A1 Apr. 8, 2010

Related U.S. Application Data

(63) Continuation-in-part of application No. 11/764,188, filed on Jun. 16, 2007.

(51) Int. Cl.
*H04M 1/00* (2006.01)
(52) U.S. Cl. ................... 379/399.02; 379/413
(58) Field of Classification Search ............... 379/93.01, 379/93.05–93.06, 325, 377, 391, 398, 399.01–399.02, 379/412–413, 413.01–413.02
See application file for complete search history.

(56) References Cited

U.S. PATENT DOCUMENTS

| | | | |
|---|---|---|---|
| 4,476,350 A | 10/1984 | Aull et al. | |
| 5,175,764 A | 12/1992 | Patel et al. | |
| 5,734,714 A | 3/1998 | Nishimura | |
| 5,854,839 A | 12/1998 | Chen et al. | |
| 6,566,957 B1 | 5/2003 | Caine | |
| 6,567,521 B1 | 5/2003 | Hein | |
| 6,934,384 B1* | 8/2005 | Hein et al. | ............... 379/399.02 |
| 7,158,633 B1 | 1/2007 | Hein | |

(Continued)

FOREIGN PATENT DOCUMENTS
EP 1173966 B1 4/2005
(Continued)

OTHER PUBLICATIONS

Kawarada et. al., High Voltage Subscriber Line Interface LSI's, IEEE Journal of Solid-State Circuits, vol. SC-17 No. 6, Dec. 1982, pp. 1144-1149.

*Primary Examiner* — Md S Elahee
*Assistant Examiner* — Akelaw Teshale
(74) *Attorney, Agent, or Firm* — Kilpatrick Townsend & Stockton LLP

(57) ABSTRACT

A subscriber line interface circuit apparatus includes a linefeed circuit and a subscriber line control circuit (SLCC). In an embodiment, the linefeed circuit includes a signal conversion circuit having cross-coupled first and second MOSFETs for providing a differential mode signal and a common mode signal in response to at least a tip signal and a ring signal from the subscriber loop. The linefeed circuit includes a tip control circuit and a ring control circuit, each having two or more MOSFETs. In an embodiment, the SLCC is provided in a single integrated circuit chip and is coupled to the linefeed circuit which isolates the SLCC from the tip or ring signals. The SLCC includes a first and a second differential mode inputs for receiving the differential mode signal, and a common-mode input for receiving the common-mode signal.

27 Claims, 11 Drawing Sheets

U.S. PATENT DOCUMENTS

| | | |
|---|---|---|
| 7,180,999 B1 | 2/2007 | Hein et al. |
| 7,190,785 B2 | 3/2007 | Hein et al. |
| 7,260,212 B1 | 8/2007 | Holzmann |
| 7,643,629 B2 * | 1/2010 | Hein et al. ............... 379/399.01 |
| 7,925,005 B2 * | 4/2011 | Mills et al. ................... 379/404 |
| 2005/0002517 A1 | 1/2005 | Hein et al. |
| 2005/0074115 A1 * | 4/2005 | George ........................ 379/418 |
| 2005/0281403 A1 | 12/2005 | Hein et al. |
| 2006/0115076 A1 * | 6/2006 | Enriquez et al. ......... 379/399.01 |
| 2008/0310616 A1 | 12/2008 | Holzmann |

FOREIGN PATENT DOCUMENTS

| | | |
|---|---|---|
| WO | WO 0065808 | 11/2000 |

* cited by examiner

METHOD AND SYSTEM FOR SUBSCRIBER LINE INTERFACE CIRCUIT HAVING A HIGH-VOLTAGE MOS LINEFEED CIRCUIT

CROSS-REFERENCES TO RELATED APPLICATIONS

This application is a continuation-in-part application of U.S. patent application Ser. No. 11/764,188, filed Jun. 16, 2007, entitled "METHOD AND SYSTEM FOR SUBSCRIBER LINE INTERFACE CIRCUIT" by Peter Holzmann, commonly assigned and incorporated in its entirety by reference herein for all purposes.

This application is also related to U.S. patent application Ser. No. 11/693,718, filed Mar. 30, 2007, entitled "METHOD AND APPARATUS FOR SUBSCRIBER LINE CONTROL CIRCUIT" by Peter Holzmann, now U.S. Pat. No. 7,260,212, commonly assigned and incorporated in its entirety by reference herein for all purposes.

BACKGROUND OF THE INVENTION

The present invention is directed to integrated circuits. More particularly, embodiments of the invention provide methods and systems for telecommunication applications. Merely by way of example, embodiments of the invention have been applied to subscriber line control circuits and subscriber linefeed circuits for interfacing with digital equipment in a central office. But it would be recognized that the invention has a much broader range of applicability. For example, embodiments of the invention can be applied in communication networks such as cable television networks, fiber optic, Ethernet port interface to the Internet, VoIP, and wireless local loop, etc.

In a Plain Old Telephone Service (POTS) system, several functions are needed for telephony signaling, subscriber line supervision, and telephone equipment operations. These functions include battery feed, over voltage protection, ringing, supervision, codec, hybrid, and testing, etc. These electronic functions are collectively known by the acronym BORSCHT. BORSCHT circuitry is often found on a telecommunications network line card for implementation of a standard POTS telephone interface for digital equipment in a central office. With the advancement of integrated circuit technology, BORSCHT circuitry can be integrated into a chipset. For example, a line card may include a SLIC, or a subscriber line interface circuit, and a CODEC circuit. In a conventional design, the SLIC typically handles the analog functions and drives the telephone lines and usually include high voltage devices and circuits, whereas the CODEC typically handles digital signal processing and interface functions. Some conventional line cards may include a SLIC integrated circuit and a CODEC integrated circuit. A conventional line card may also include certain discrete components such as switching relays, large capacitors, etc. These conventional techniques have many limitations, some of which are described in more details below.

From the above, it is seen that an improved technique for subscriber line interface circuit is desired.

BRIEF SUMMARY OF THE INVENTION

According to an embodiment of the invention, in a subscriber line interface circuit apparatus for a subscriber loop, a linefeed circuit in combination with subscriber line control circuitry (SLCC) is provided wherein a first node is coupled to a first signal line and a second node is coupled to a second signal line to receive a tip signal and a ring signal, respectively, from the subscriber loop. The linefeed circuit includes a signal conversion circuit which is coupled to the first node and the second node to receive the tip signal and the ring signal, respectively and which provides both a differential mode signal and a related common mode signal in response to at least the tip signal and the ring signal so the SLCC circuitry need not derive such signals. In a specific embodiment, the common mode signal is associated with a sum of the tip signal and the ring signal, and the differential mode signal is associated with a difference between the same tip signal and ring signal.

In a specific embodiment, the SLCC includes multiple control signal outputs for driving amplifiers associated with the tip and ring control circuits, in addition to an amplifier circuit for receiving the voice band or audio band signal from the linefeed circuit, an impedance matching circuit which is coupled to the amplifier circuit, a hybrid circuit coupled to the impedance matching circuit, and a codec which is coupled to the hybrid circuit. In a specific embodiment, the linefeed circuit includes discrete components, whereas in another embodiment, the linefeed circuit is implemented as an integrated circuit.

In some embodiments, the line feed circuit is implemented using MOS transistors. As used herein, the terms "MOS transistor" and "MOSFET" are interchangeable. In some embodiments, the MOS transistors are configured to operate with voltage of 100 volts or higher. In an embodiment, the differential mode signal is provided by two cross-coupled MOSFETs. Compared to conventional bipolar line feed circuits, the MOS line feed circuits of embodiments of the present invention can be manufactured less expensively and can be designed with less power consumption. In certain applications, MOS current mirror circuits are used, further simplifying the control circuits, reduce power consumption, and reduce the integrated circuit pin counts. In certain embodiments, the linefeed circuit includes circuits configured in class AB and can reduce power consumption in low signal or idle conditions.

A specific embodiment of the present invention provides a subscriber line interface circuit apparatus for a subscriber loop. The apparatus includes a linefeed circuit and a subscriber line control circuit (SLCC). The SLCC is provided in a single integrated circuit chip and is coupled to the linefeed circuit. In an embodiment, the linefeed circuit includes a first node coupled to a first signal line and a second node coupled to a second signal line to receive a tip signal and a ring signal, respectively, from the subscriber loop. The linefeed circuit includes a signal conversion circuit which is coupled to the first node and the second node to receive the tip signal and the ring signal, respectively. The signal conversion circuit provides a differential mode signal and a common mode signal in response to at least the tip signal and the ring signal. In an embodiment, the signal conversion circuit includes cross-coupled first and second MOSFETs for providing the differential mode signal. In a specific embodiment, the common mode signal is associated with a sum of the tip signal and the ring signal, and the differential mode signal is associated with a difference between the tip signal and the ring signal. The linefeed circuit includes a filter circuit which is coupled to the subscriber loop and provides voice band or audio band signals to the SLCC. In some embodiments, audio band includes a frequency range of about 20 Hz to 20,000 Hz, and voice band has a frequency range of about 300 Hz to 3,400 Hz. The linefeed circuit also includes a tip control circuit and a ring control circuit. The tip control circuit is coupled to the first node and provides a tip output signal to the first signal line in response to at tip control voltage signal and a second tip control current signal. In an embodiment, the tip control circuit includes two or more MOSFETs. The ring control circuit is coupled to the second node and provides a ring output signal to the second signal line in response to a ring control voltage signal and a ring control current signal. In an embodiment, the ring control circuit includes two or more MOSFETs.

In a specific embodiment, a subscriber line control circuit (SLCC) is provided in a single integrated circuit chip. In an embodiment, the SLCC is coupled to the linefeed circuit and is isolated from the first and second signal lines. In an embodiment, the linefeed circuit isolates the SLCC from the first signal line and the second signal line. In other words, SLCC does not sense the tip signal or the ring signal according to embodiments of the present invention. In contrast, the SLCC receives a differential mode signal and a common mode signal, and can be relatively more isolated from the tip and ring signals. In a specific embodiment, the SLCC includes a first and a second differential mode inputs and a common mode input. The differential mode inputs receive the differential mode signal from the linefeed circuit. The common mode input receives the common mode signal from the linefeed circuit.

In an embodiment, the SLCC also includes an analog to digital converter circuit which is coupled to the common mode input and the differential mode inputs. The SLCC also includes an analog control circuit which is coupled to the common mode input and the differential mode inputs and provides the individual tip and ring control signals in response to at least the common mode signal and the differential mode signal, without providing DC common mode control of the Tip and Ring signals. These control signals are described below. The SLCC includes an amplifier circuit for receiving the voice or audio band signals and a codec circuit coupled to the amplifier circuit for providing coding and decoding functions for the voice or audio band signals. The SLCC also includes a first tip control output and a second tip control output coupled to the analog control circuit and provides the first tip control current signal and the second tip control current signal, respectively. The SLCC includes a first ring control output and a second ring control output coupled to the analog control circuit and provides the first ring control current signal and the second ring control current signal, respectively.

In a specific embodiment, the subscriber line interface circuit apparatus described above includes a signal conversion circuit that includes first transistor and a second transistor. A first terminal of the first transistor is coupled to a resistor connected to the first node, a second terminal of the first transistor is coupled to a resistor connected to the second node, a third terminal of the first transistor is coupled to a first differential mode signal current, a first terminal of the second transistor is coupled to a resistor connected to the second node, a second terminal second transistor is coupled to a resistor connected to the first node, and a third terminal of the second transistor is coupled to a second differential mode signal current. The first and second differential mode signal currents provide the differential mode signal. In an embodiment, the first and second differential mode signal currents are mirrored into the a subscriber line feed circuit (SLFC) integrated circuit chip. In an embodiment, the signal conversion circuit also includes a first resistor and a second resistor. A first terminal of the first resistor is coupled to the first node, a second terminal of the first resistor is coupled to the common mode signal, a first terminal of the second resistor is coupled to the second node, and a second terminal of the second resistor is coupled to the common mode signal.

In a specific embodiment of the subscriber line interface circuit apparatus described above, the tip control circuit includes a first tip control MOSFET transistor and a second tip control MOSFET transistor. A source terminal of each of the first tip control MOSFET transistor and the second tip control MOSFET transistor is in communication with the first tip control current signal and the second tip control current signal, respectively. In an embodiment, a gate terminal of the first tip control transistor is in communication with a gate terminal of the second tip control transistor. In a specific embodiment, the ring control circuit includes a first ring control MOSFET transistor and a second ring control MOSFET transistor. A source terminal of each of the first ring control MOSFET transistor and the second ring control MOSFET transistors is in communication with the first ring control current signal and the second ring control current signal, respectively. In an embodiment, a gate terminal of the first ring control transistor is in communication with a gate terminal of the second ring control transistor. In a specific embodiment, the linefeed circuit comprises discrete components. In another embodiment, the linefeed circuit is implemented in an integrated circuit.

According to another embodiment of the invention, an integrated circuit apparatus is provided for controlling a subscriber loop. The integrated circuit apparatus includes a common mode input and a first and a second differential mode inputs. The common mode input receives a common mode signal, and the first and second differential mode inputs receive a differential mode signal. In a specific embodiment, the common mode input signal is related to a sum of a tip signal and a ring signal of the subscriber loop. In an embodiment, the differential mode signal is related to a difference between the tip signal and the ring signal of the subscriber loop. In a specific embodiment, the common mode signal is generated outside the integrated circuit apparatus, while the differential mode signal is generated in another integrated circuit chip. The integrated circuit apparatus is isolated from the tip signal and the ring signal. In other words, the integrated circuit apparatus does not receive a sensed tip signal or a sensed ring signal. The integrated circuit apparatus includes an analog to digital converter circuit which is coupled to the common mode input and the differential mode inputs. The integrated circuit apparatus includes an analog control circuit which is coupled to the common mode input and the differential mode inputs and provides individual tip and ring control signals in response to at least the common mode signal and the differential mode signal, without providing DC common mode control of the Tip and Ring signals. These control signals include the following:

1. A first tip control current signal and a second tip control current signal provided by a first tip control output and a second tip control output, respectively, which are coupled to the analog control circuit;
2. A first ring control current signal and a second ring control current signal provided by a first ring control output and a second ring control output, respectively, which are coupled to the analog control circuit;

In another embodiment, the control signals include the following:

1. A first tip control current signal, a second tip control current signal, and a first tip control voltage signal provided by a first, a second, and a third tip control outputs, respectively, which are coupled to the analog control circuit;

2. A first ring control current signal, a second ring control current signal, and a first ring control voltage signal provided by a first, a second, and a third ring control outputs, respectively, which are coupled to the analog control circuit;

In an embodiment, the integrated circuit apparatus also includes an amplifier circuit for receiving the voice or audio band signal, respectively, an impedance matching circuit couple to the amplifier, a hybrid circuit coupled to the impedance matching circuit, and a codec coupled to the hybrid circuit. In an embodiment, the analog control circuit also includes an analog voltage feedback circuit, a current feedback circuit, and a summation circuit.

According to an alternative embodiment of the invention, a subscriber line interface circuit apparatus is provided for a subscriber loop. The apparatus includes a linefeed circuit and a subscriber line control circuit. The linefeed circuit provides a differential mode signal and a common mode signal in response to at least a tip signal and a ring signal from the subscriber loop. In a specific embodiment, the linefeed circuit include bipolar transistors. In another embodiment, the linefeed circuit has cross-coupled first and second MOSFETs for providing the differential mode signal, two or more of MOSFETs for providing the tip output signal, and two or more MOSFETs for providing the ring output signal. The linefeed circuit also provides a tip output signal and a ring output signal to the subscriber loop in response to one or more ring control signals and one or more tip control signals. The subscriber line control circuit is coupled to the linefeed circuit for receiving the differential mode signal and the common mode signal from the linefeed circuit. The subscriber line control circuit provides the one or more ring control signals and the one or more tip control signals to the linefeed circuit. In an embodiment, the one or more ring control signals include at least a ring control current signal, and the one or more tip control signals include at least a tip control current signal.

In a specific embodiment, the linefeed circuit includes a first node coupled to a first signal line and a second node coupled to a second signal line to receive a tip signal and a ring signal, respectively, from the subscriber loop. The linefeed circuit includes a signal conversion circuit which is coupled to the first node and the second node to receive the tip signal and the ring signal, respectively. In an embodiment, the signal conversion circuit has the cross-coupled first and second bipolar transistors and is configured to provide a differential mode signal and a common mode signal in response to at least the tip signal and the ring signal. In another embodiment, the signal conversion circuit has the cross-coupled first and second MOSFETs and is configured to provide the differential mode signal and the common mode signal in response to at least the tip signal and the ring signal. In a specific embodiment, the common mode input signal is associated with a sum of the tip signal and the ring signal, and the differential mode input signal is associated with a difference between the tip signal and the ring signal. The linefeed circuit includes a filter circuit which is coupled to the signal conversion circuit and provides voice band or audio band signals. The linefeed circuit also includes a tip control circuit and a ring control circuit. The tip control circuit is coupled to the first node and provides a tip output signal to the first signal line in response to a first tip control current signal and a second tip control current signal. The ring control circuit is coupled to the second node and provides a ring output signal to the second signal line in response to a first ring control current signal and a second ring control current signal. In an embodiment, a subscriber line control circuit (SLCC) is provided in a single integrated circuit chip. In a specific embodiment, the SLCC is coupled to the linefeed circuit and is isolated from the first and second signal lines. In other words, the SLCC does not sense the tip signal or the ring signal. The SLCC includes a first and a second differential mode inputs and a common mode input. The differential mode inputs and common mode input receive the differential mode signal and the common mode signal, respectively, from the linefeed circuit.

In an embodiment of the above subscriber line interface circuit apparatus, the ring control circuit and the tip control circuit each includes a class AB amplifier control circuit.

In a specific embodiment, the SLCC includes an analog to digital converter circuit which is coupled to the common mode input and the differential mode inputs. The SLCC also includes an analog control circuit which is coupled to the common mode input and the differential mode inputs. The analog control circuit provides the individual tip and ring control signals in response to at least the common mode signal and the differential mode signal, without providing DC common mode control of the Tip and Ring signals. These control signals are described below. The SLCC includes a first and a second tip control outputs coupled to the analog control circuit and provides the first and second tip control current signals, respectively. The SLCC also includes a first and a second ring control outputs coupled to the analog control circuit and provides the first and second ring control current signals, respectively. The SLCC includes an amplifier circuit for receiving the voice band or audio band signal, respectively, from the linefeed circuit, an impedance matching circuit which is couple to the amplifier, a hybrid circuit coupled to the impedance matching circuit, and a codec which is coupled to the hybrid circuit. In a specific embodiment, the linefeed circuit includes discrete components, whereas in another embodiment, the linefeed circuit is implemented in an integrated circuit.

In yet another embodiment, the invention provides a subscriber line interface circuit apparatus for a subscriber loop. The apparatus includes a linefeed circuit and a subscriber line control circuit (SLCC). The linefeed circuit includes a first node and a second node. The first node is coupled to a first signal line to receive a tip signal from the subscriber loop, and the second node is coupled to a second signal line to receive a ring signal from the subscriber loop. The linefeed circuit includes a signal conversion circuit, which is coupled to the first node and the second node to receive the tip signal and the ring signal, respectively. The signal conversion circuit provides a common mode signal in response to at least the tip signal and the ring signal. The signal conversion circuit also providing a DC ring signal. The linefeed circuit also includes a filter circuit, which is coupled to the signal conversion circuit and provides audio band or voice band signals. The linefeed circuit also includes a tip control circuit coupled to the first node and a ring control circuit coupled to the second node.

In an embodiment, the tip control circuit provides a tip output signal to the first signal line in response to a tip control voltage signal and a tip control current signal, whereas the ring control circuit provides a ring output signal to the second signal line in response to a ring control voltage signal and a ring control current signal.

In another embodiment, the tip control circuit has two or more MOSFETs for providing a tip output signal to the first signal line in response to a tip control voltage signal and a tip control current signal, whereas the ring control circuit has two or more MOSFETs for providing a ring output signal to the second signal line in response to a ring control voltage signal and a ring control current signal.

In a specific embodiment, the subscriber line control circuit is provided in a single integrated circuit chip. In an embodiment, the subscriber line control circuit (SLCC) includes a common mode input and a DC ring signal input. The common mode input receives the common mode signal from the linefeed circuit, and the DC ring signal input receives the DC ring signal from the linefeed input. The SLCC also includes an analog control circuit coupled to the common mode input and the DC ring signal input. the analog control circuit providing the tip control voltage signal, the tip control current signal, the ring control voltage signal, and ring control current signal in response to at least the common mode signal and the DC ring signal; The SLCC also includes an amplifier circuit for receiving audio band or voice band signals from the linefeed circuit, and a codec which coupled to the amplifier circuit.

In an embodiment of the subscriber line interface circuit apparatus, the subscriber line control circuit (SLCC) also includes an analog to digital converter circuit which is coupled to the common mode input and the DC ring input. In an embodiment, the SLCC also includes an analog control circuit coupled to the common mode input and the DC ring input to provide the first tip control current signal, the second tip control current signal, the first ring control current signal, and the second ring control current signal in response to at least the common mode signal and the DC ring signal. The SLCC also includes several control signal outputs. A first and a second tip control outputs are coupled to the analog control circuit to provide the tip control voltage and current signals, respectively. A first and a second ring control outputs are coupled to the analog control circuit to provide the ring control voltage and current signals, respectively.

In a specific embodiment, the common mode input signal is associated with a sum of the tip signal and the ring signal. In an embodiment, the signal conversion circuit further includes a first resistor and a second resistor. A first terminal of the first resistor is coupled to the first node, a second terminal of the first resistor is coupled to the common mode signal, a first terminal of the second resistor is coupled to the second node, and a second terminal of the second resistor is coupled to the common mode signal. In an embodiment, the tip control circuit includes a first tip control MOSFET transistors and a second tip control MOSFET transistor. An source terminal of each of the first tip control MOSFET transistor and the second tip control MOSFET transistor is in communication with the tip control voltage signal and the tip control current signal, respectively. In an embodiment, the ring control circuit includes a first ring control MOSFET transistor and a second ring control MOSFET transistor. An source terminal of each of the first ring control MOSFET transistor and the second ring control MOSFET transistor is in communication with the ring control voltage signal and the ring control current signal, respectively. In a specific embodiment, the linefeed circuit comprises discrete components, whereas in another embodiment, the linefeed circuit is implemented in an integrated circuit.

Many benefits are provided by way of the present invention over conventional techniques. In a specific embodiment, the invention provides a subscriber loop control circuit which includes differential and common-mode signals, and is relatively isolated from the subscriber loop. There is no need for a signal processor to calculate the common mode and differential mode signals. In an embodiment, the invention provides feedback common mode and differential mode input signals that allow remote detection of a subscriber line circuit faulty condition as indicated by a melted fuse. For example, by comparing the common mode voltage and differential mode voltages against target voltages, the subscriber line control circuit can determine whether the fuse between the subscriber loop and the linefeed circuit is melted. This remote fault detection capability can reduce the cost of a subscriber line service. In some embodiments, the invention provides a subscriber line control circuit that is relatively less expensive than conventional circuits. Embodiments of the invention have a broad range of applicability. For example, certain embodiments of the invention are useful in packet switched telephony applications, which use a 'plain old telephone' interface. In an embodiment, the invention can be used in residential VOIP. A specific embodiment of the invention can be used in a device called an ATA (analog terminal adapter), which has an interface to the 'plain old telephone. The above-mentioned remote fault detection capability can be especially advantageous in reducing the cost of service in residential ATA's. In another example, embodiments of the invention can be used with an Ethernet port to be in communication with an Internet router. These and other benefits will be described in more detail throughout the present specification and more particularly below.

Various additional objects, features, and advantages of the present invention can be more fully appreciated with reference to the detailed description and accompanying drawings that follow.

DETAILED DESCRIPTION OF THE INVENTION

Figure 1:
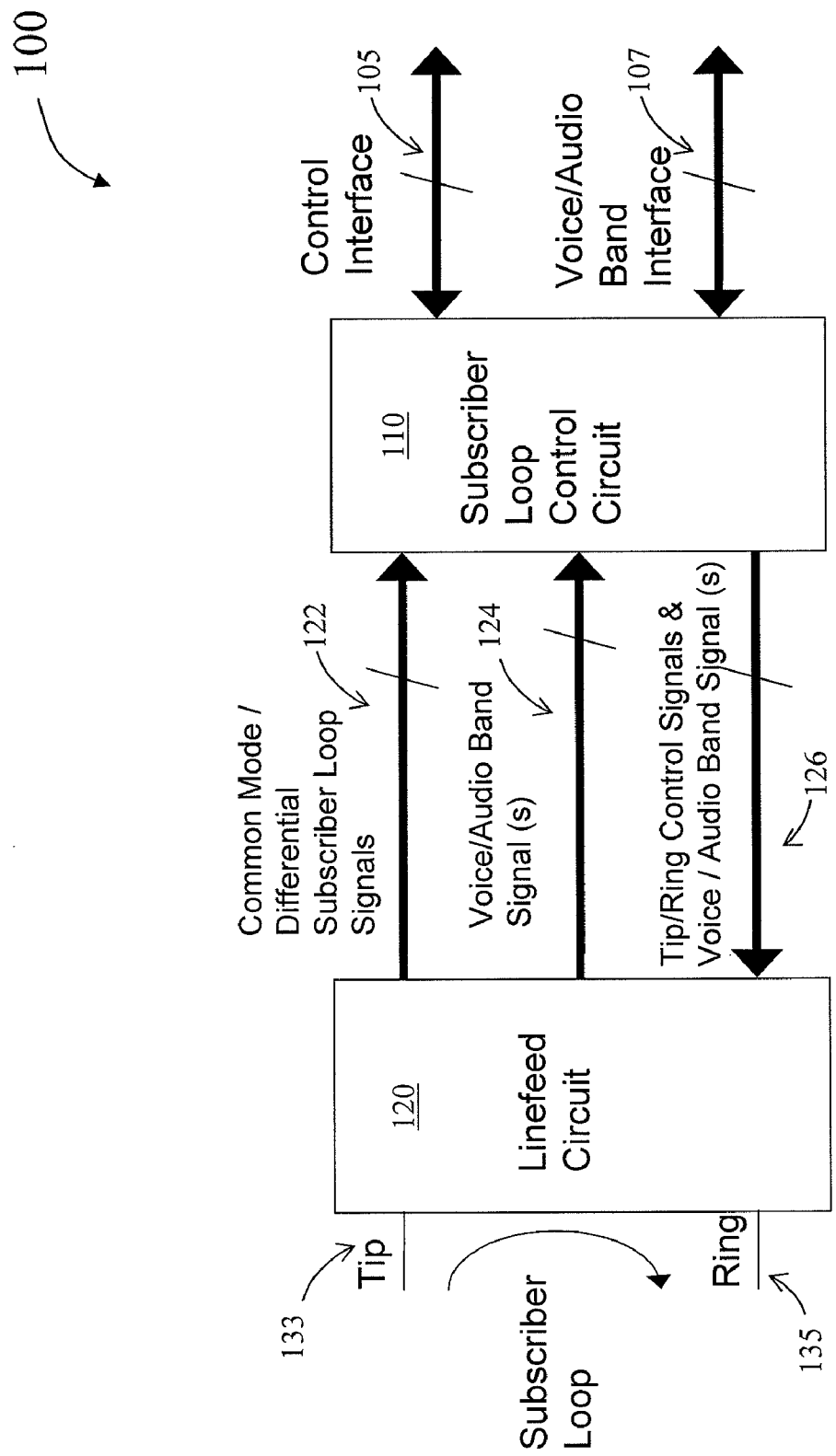
FIG. 1 is a simplified block diagram of a subscriber line interface circuit (SLIC) according to an embodiment of the present invention.

The present invention is directed to integrated circuits. More particularly, the invention provides a method and device for an integrated circuit for telecommunication. Merely by way of example, the invention has been applied to subscriber line control circuits for interfacing with digital equipment in a central office. But it would be recognized that the invention has a much broader range of applicability. For example, embodiments of the invention can find application in communication networks such as cable television networks, fiber optic, Ethernet port interface to the Internet, VoIP, and wireless local loop, etc.

As discussed above, conventional subscriber line interface chipset combination of a SLIC chip and a CODEC chip have certain limitations. A disadvantage of this conventional design is that it involves a large number of circuit components on the high voltage and high power SLIC integrated circuit. As a result, conventional designs can be relatively expensive. Alternative designs have been suggested. For example, a technique for partitioning the SLIC into multiple integrated circuits is presented in K. Kawarada et al, "High Voltage Subscriber Line Interface LSIs", IEEE Journal of Solid-State Circuit, Vol. SC-17, No. 6, pp. 1144-1149, December 1982. As shown in Kawarada et al FIG. 2, certain control functions of the SLIC are implemented in a CMOS chip (CONT). A high voltage bipolar LSI chip (RT) performs the ringing and testing functions. A medium voltage bipolar LSI chip (BSH) performs the battery feed, supervision, and hybrid functions. Kawarada et al also includes another CMOS chip for the CODEC function. Even though the techniques provided by Kawarada et al may have some benefits such as moving certain circuit components to a low voltage CMOS chip, there are many limitations. For example, a large number of separate integrated circuits are needed. In addition, signals on the tip and ring lines are directly fed into the RT and BSH circuits. They are less isolated from the tip and ring lines. As a result, the circuits may be susceptible to variations in the tip and ring lines.

In another example, in U.S. Pat. No. 6,934,384 by Hein et al, a subscriber loop interface circuit apparatus includes a signal processor having sense inputs for a sensed tip signal and a sensed ring signal of a subscriber loop. The signal processor generates a linefeed driver control signal in response to the sensed signals and the signal processor resides on a same integrated circuit die as a codec for bi-directional communication of voiceband data between the analog subscriber loop and a digital interface of the signal processor. In U.S. Pat. No. 6,934,384, a signal processor 210 can be found in FIG. 2 and sensed tip signals 332 and 334 and sensed ring signals 336 and 338 can be found in FIG. 3. U.S. Pat. No. 6,934,384 also provides an apparatus including a signal processor generating subscriber loop control signals in response to a sensed tip signal and a sensed ring signal of a subscriber loop, and a linefeed driver portion for driving the subscriber loop in accordance with the subscriber loop control signals, the linefeed driver portion providing the sensed tip and ring signals. Each of the linefeed driver portion and the signal processor resides on an integrated circuit die, wherein the signal processor resides on a same integrated circuit die as a codec for bi-directional communication of voiceband data between the analog subscriber loop and a digital interface of the signal processor. A signal processor 210 and a linefeed driver 220 can be found in FIG. 2 of Hein et al. Sensed tip signals 332 and 334 and sensed ring signals 336 and 338 can be found in FIG. 3. Bi-direction voiceband data lines 322, 324, 326, and 328 can be found in FIG. 3 of Hein et al. Even though the techniques provided by U.S. Pat. No. 6,934,384 may have some benefits, there are many limitations. For example, in U.S. Pat. No. 6,934,384 the signal processor senses the tip and ring lines, being less isolated from the tip and ring lines. As a result, the signal processor may be susceptible to variations in the tip and ring lines. Moreover, in U.S. Pat. No. 6,934,384, the common mode and differential mode components are calculated by the signal processor rather than the linefeed driver. A disadvantage of this design is that the signal processor requires additional circuitry and power consumption. This tends to increase the cost of the design and manufacture.

Certain other conventional designs appear to use similar techniques as U.S. Pat. No. 6,934,384. For example, in U.S. Pat. No. 7,180,999 by Hein et al and U.S. Pat. No. 7,190,785 by Hein et al, a signal processor 210 can be found in FIG. 2 and sensed tip signals 332 and 334 and sensed ring signals 336 and 338 can be found in FIG. 3 in the respective patent. In U.S. Pat. No. 7,158,633 by Hein, a signal processor 210 can be found in FIG. 2 and sensed tip signals 332 and 334 and sensed ring signals 336 and 338 can be found in FIG. 3. Further, in FIG. 7 of U.S. Pat. No. 7,158,633 by Hein, signal processor 710 receives two sensed tip signals 732 and 734 and two sensed ring signals 736 and 738. These conventional designs tend to suffer from similar limitations as described above.

Therefore, improved techniques for subscriber line interface circuit are desired.

According embodiments of the present invention, improved techniques for subscriber line interface circuit are provided. Depending upon the embodiment, the present invention includes various features, which may be used. These features include the following:

1. A subscriber line interface circuit apparatus for a subscriber loop that includes a linefeed circuit in combination with subscriber line control circuitry (SLCC);
2. A linefeed circuit that includes a unique signal conversion circuit which provides both a differential mode signal and a related common mode signal in response to at least the tip signal and the ring signal so the SLCC circuitry need not derive such signals. In an embodiment, the line feed circuit includes cross-coupled MOSFETs;
3. A subscriber line control circuit (SLCC) which receives the common mode and differential mode signals. The common mode and differential mode signals can be used directly for monitoring the common mode and differential mode voltages on the subscriber line;
4. A subscriber line control circuit (SLCC) that is isolated from the tip signal and the ring signal by the linefeed circuit. The SLCC is therefore relatively independent of the instabilities in the tip signal and the ring signal; and
5. A subscriber line interface circuit apparatus in which a linefeed circuit provides common mode and differential mode signals which can be used for remote detection of a faulty condition on the subscriber line.

As shown, the above features may be in one or more of the embodiments to follow. These features are merely examples, which should not unduly limit the scope of the claims herein. One of ordinary skill in the art would recognize many variations, modifications, and alternatives. It is also noted that in this application, the term "subscriber line" and the term "subscriber loop" are used interchangeably.

FIG. 1 is a simplified block diagram of a subscriber line interface circuit (SLIC) 100 according to an embodiment of the present invention. This diagram is merely an example, which should not unduly limit the scope of the claims herein. One of ordinary skill in the art would recognize other variations, modifications, and alternatives. As shown, SLIC circuit 100 includes a subscriber loop control circuit (SLCC) 110 and a linefeed circuit 120. In an embodiment, the subscriber loop control circuit 110 provides control signals 126 to the linefeed circuit in response to common mode and/or differential subscriber loop signals 122 from the linefeed circuit. In a specific embodiment, the common mode and/or differential mode signals are provided by the linefeed circuit 120 and do not need to be calculated by the subscriber loop control circuit 110. Therefore, they can be used directly in the subscriber loop control circuit 110 for monitoring the common mode and differential mode voltages on the subscriber line. In an embodiment, a common mode subscriber loop signal can be either a voltage or a current. For example, a common mode subscriber loop signal can be related to a sum of the subscriber loop voltages. In a specific embodiment, a common mode subscriber loop signal is proportional to a sum of the subscriber loop voltages, e.g. Tip signal 133 and Ring signal 135. In an embodiment, the differential subscriber loop signals can either be a voltage or a current. In another example, the differential subscriber loop signal can be related to the subscriber loop signals, e.g. Tip signal 133 and Ring signal 135. In a specific embodiment, the differential subscriber loop signal can be proportional to the voltage across the subscriber loop.

According to an embodiment of the invention, a subscriber line interface circuit (SLIC) is provided that includes a subscriber loop control circuit (SLCC) and a linefeed circuit. In an embodiment, the SLCC is provided in a single integrated circuit chip. In a specific embodiment, the SLCC and the linefeed circuit can be built within a single integrated circuit package. In another embodiment, the SLCC and the linefeed circuit can be in separate IC packages. In an alternative embodiment, the linefeed circuit is implemented using discrete components. In an embodiment, the interface between a linefeed circuit and a subscriber loop control circuit can include a common mode and/or a differential mode subscriber loop signal and voice band or audio band data signals. In some embodiments, audio band includes a frequency range of about 20 Hz to 20,000 Hz and voice band has a frequency range of about 300 Hz to 3,400 Hz.

Referring to FIG. 1, in a specific embodiment of the invention, subscriber loop control circuit 110 receives common mode and differential mode signals 122 and voice band and/or audio band signals 124 from the linefeed circuit 120. Subscriber loop control circuit 110 generates tip/ring control signals 126 which include superimposed audio/voice band signals, in response to at least the common mode/differential mode signals, the voice band and/or audio band signals, the control interface 105 and the Voice band and/or audio band interface 107. In an embodiment, the control interface 105 and the Voice band and/or audio band interface 107 are coupled to a digital communication network. Merely as examples, the digital communication network can be found in a central office of a telephone service provider, cable television networks, fiber optic, Ethernet port interface to the Internet, VoIP, and wireless local loop, etc. In a specific embodiment, the invention provides a subscriber loop control circuit which includes a programmable CODEC, a programmable hybrid and programmable subscriber line impedance matching for worldwide deployment. In another embodiment, the invention provides a combination of a subscriber loop control circuit and linefeed circuit, which provides substantially all the BORSCHT functions required for subscriber line operation. Of course, there can be other variations, modifications, and alternatives.

Figure 2A:
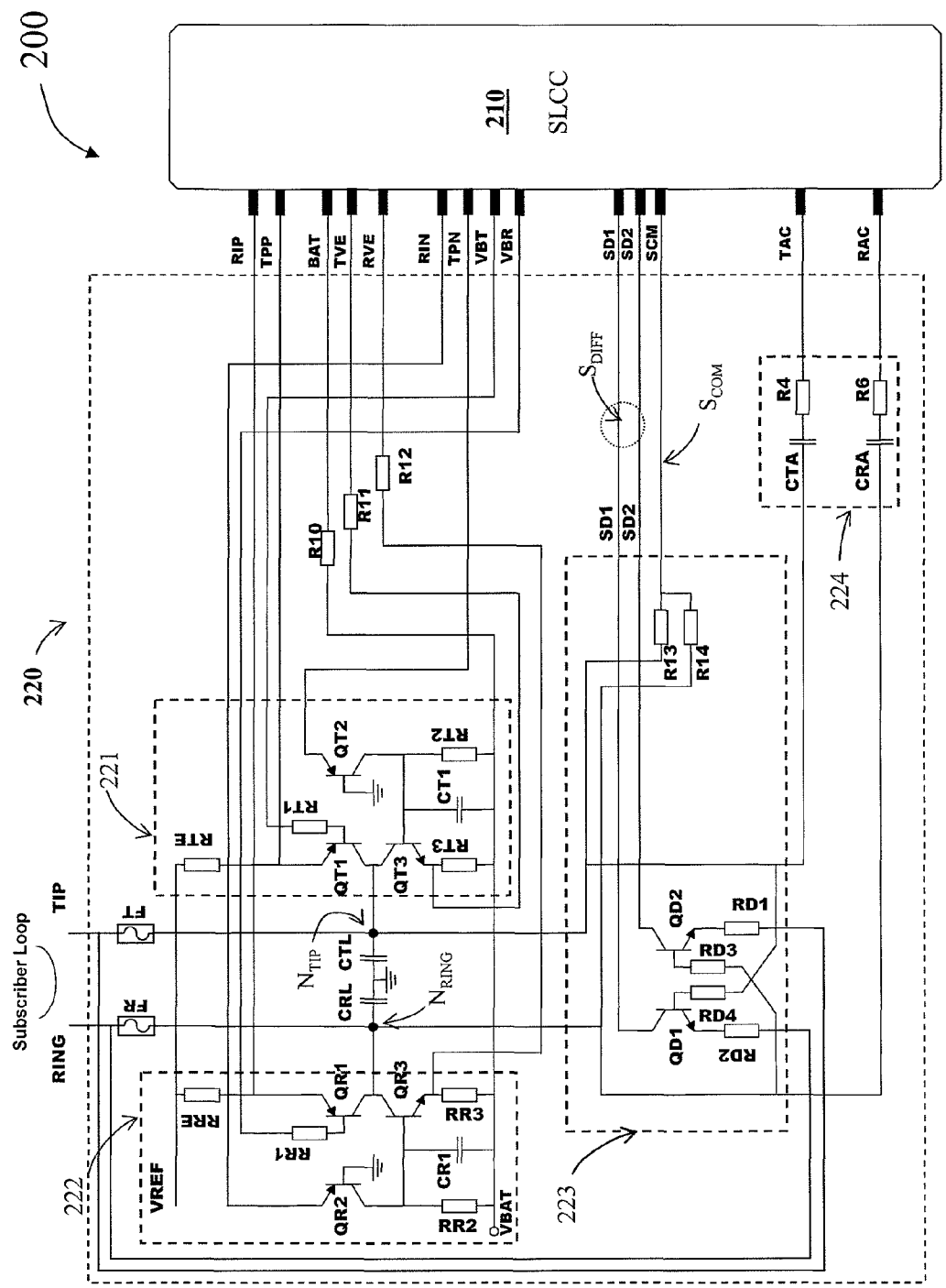
FIG. 2a is a simplified block diagram of a subscriber line interface circuit (SLIC) according to an another embodiment of the present invention.

FIG. 2a is a simplified block diagram of a subscriber line interface circuit (SLIC) 200 according to another embodiment of the present invention. This diagram is merely an example, which should not unduly limit the scope of the claims herein. One of ordinary skill in the art would recognize other variations, modifications, and alternatives. As shown, SLIC circuit 200 includes a subscriber loop control circuit (SLCC) 210 and a linefeed circuit 220. The linefeed circuit 220 includes TIP control circuit 221, RING control circuit 222, a signal conversion circuit 223, and a filter circuit 224. In an embodiment, linefeed circuit 220 includes circuit nodes $N_{TIP}$ and $N_{RING}$. Node $N_{TIP}$) is coupled to a signal line to receive a tip signal TIP from the subscriber loop. Node $N_{RING}$ is coupled to a second signal line to receive a ring signal RING from the subscriber loop. In a specific embodiment, the linefeed circuit 220 also includes a fuse FT coupled between node $N_{TIP}$) and tip signal TIP from the subscriber loop, and a second fuse FR and coupled between node $N_{RING}$ and ring signal RING from the subscriber loop. In an alternative embodiment, fuses FT and FR can be omitted.

As shown in FIG. 2a, signal conversion circuit 223 provides a common mode signal $S_{COM}$ and a differential mode signal $S_{DIFF}$ in response to the tip signal TIP and the ring signal RING of the subscriber loop. In a specific embodiment, the signal conversion circuit 223 includes a resistor R13 coupled between node $N_{TIP}$ and common mode signal $S_{COM}$, and a second resistor R14 between node $N_{RING}$ and common mode signal $S_{COM}$. In a specific embodiment, the common-mode signal $S_{COM}$ is proportional to a sum of the subscriber loop tip and ring voltages. In an embodiment, signal conversion circuit 223 includes transistors QD1 and QD2, and resistors RD1, RD2, RD3, and RD4 as shown in FIG. 2a. In an embodiment, the differential mode signal is provided across a first differential signal line SD1 and a second differential signal line SD2 as shown in FIG. 2a. In a specific example, transistors QD1 and QD2 are bipolar transistors. As shown, resistor RD4 is coupled between a base terminal of QD1 and node $N_{TIP}$, and resistor RD3 is coupled between a base terminal of QD2 and node $N_{RING}$. In a specific embodiment, resistor RD2 is coupled between an emitter terminal of QD1 and the ring signal RING from the subscriber loop, and resistor RD1 is coupled between an emitter terminal of QD2 and the tip signal TIP from the subscriber loop. In the embodiment shown in FIG. 2a, differential mode signal $S_{DIFF}$ is provided across signal lines SD1 and SD2, which are coupled to a collector terminal of transistor QD1 and a collector terminal of transistor QD2, respectively. In an embodiment, differential mode signal $S_{DIFF}$ is proportional to a difference between the tip signal and the ring signal. Of course, there can be other variations, modifications, and alternatives. For example, in an alternative embodiment, the emitter terminal of QD1 and the base terminal of QD2 are both coupled to node $N_{RING}$, and an emitter terminal of QD2 and a base terminal of QD1 are both coupled to node $N_{TIP}$.

As shown in FIG. 2a, linefeed circuit 220 includes a filter circuit 224, which includes capacitor CRA and resistor R6 connected in series to provide an audio band signal input terminal RAC of SLCC 210. Similarly, filter circuit 224 includes capacitor CTA and resistor R4 connected in series to provide an audio band signal to input terminal TAC of SLCC 210. In some embodiments of the present invention, audio band includes a frequency range of about 20 Hz to 20,000 Hz, and voice band has a frequency range of about 300 Hz to 3,400 Hz.

Figure 2B:
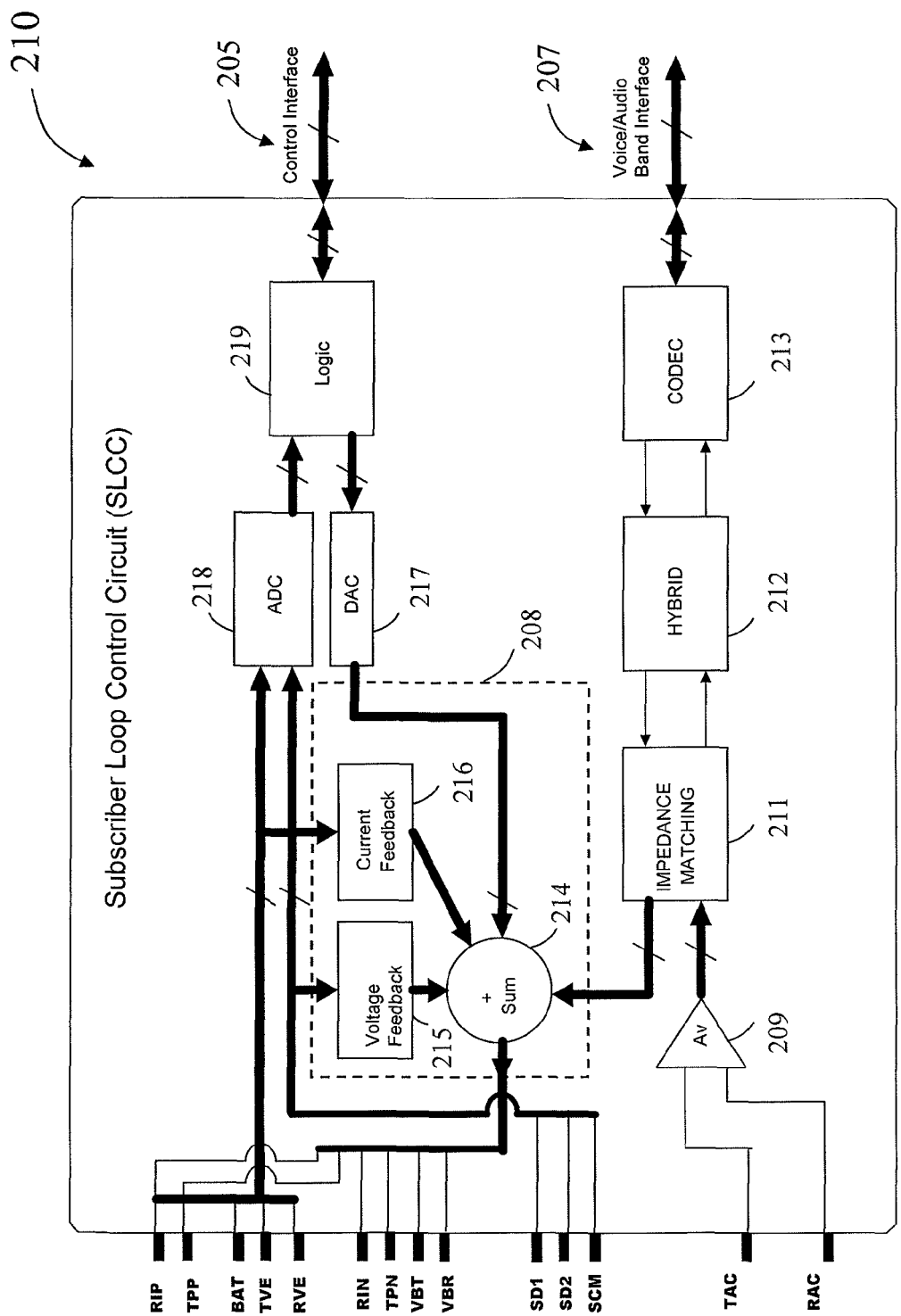
FIG. 2b is a simplified block diagram of a subscriber line control circuit (SLCC) according to an embodiment of the present invention.

FIG. 2b is a simplified block diagram of a subscriber line control circuit (SLCC) 210 according to an embodiment of the present invention. This diagram is merely an example, which should not unduly limit the scope of the claims herein. One of ordinary skill in the art would recognize other variations, modifications, and alternatives. As shown, the subscriber line control circuit 210 includes amplifier circuit 209, impedance matching circuit 211, hybrid circuit block 212, and programmable codec 213. In an embodiment, SLCC 210 also includes analog control circuit 208, digital-to-analog converter circuit (DAC) 217, analog-to-digital circuit (ADC) 218, and logic circuit 219. In a specific embodiment, analog control circuit 208 includes a summation circuit 214, analog voltage feedback circuit 215, and current feedback circuit 216. In an embodiment, the subscriber line control circuit 210 includes input terminals RAC and TAC for receiving voice band or audio band signals from the linefeed circuit 220. In some embodiments, these circuit blocks together implement many of the BORSCHT functions. For example the amplifier 209 receives AC voice band or audio band signals from the linefeed circuit 220. The impedance matching circuit 211 matches the characteristic impedance of the subscriber line. In an embodiment, the hybrid circuit 212 performs 2-wire to 4-wire conversion. The codec 213 performs coding and decoding functions for the voice or audio band signals. In a preferred embodiment, the SLCC is provided in a single integrated circuit chip. Of course, there can be other variations, modifications, and alternatives.

In a specific embodiment, SLCC 210 includes an input SCM for receiving the common mode signal $S_{COM}$ from the linefeed circuit, and also includes inputs SD1 and SD2 for receiving the differential mode signal $S_{DIFF}$ from the linefeed circuit. As shown in FIGS. 2a and 2b, the SLCC 210 is isolated from the tip signal TIP and the ring signal RING by the signal conversion circuit 223 in the linefeed circuit. In other words, SLCC 210 does not sense the tip signal or the ring signal according to embodiments of the present invention. In contrast, SLCC 210 receives a differential mode signal and a common mode signal, and can be relatively independent from the instabilities of the tip and ring signals.

As shown in FIG. 2b, in an embodiment, SLCC 210 includes output terminals TPP and TPN for providing tip control current signals. Similarly, SLCC 210 includes output terminals RIP and RIN for providing ring control current signals. In a specific embodiment, the subscriber line control circuit 210 also includes terminals VBT and VBR for providing tip and ring control voltage signals, respectively. These tip and ring control current and voltage signals are provided by the analog control circuit 208 in response to at least the common mode signal $S_{COM}$ and differential mode signal $S_{DIFF}$ from the linefeed circuit 220, and signals derived from the control interface 205 and voice/audio band interface 207. In an embodiment, the control interface 205 and the Voice band and/or audio band interface 207 are coupled to a digital communication network. For example, the digital communication network can be found in a central office of a telephone service provider, cable television networks, fiber optic, Ethernet port interface to the Internet, VoIP, or wireless local loop, etc. Of course, there can be other variations, modifications, and alternatives.

Referring back to FIG. 2a, in a specific embodiment, the tip control signals TPP and TPN are received by tip control circuit 221, which is coupled to the $N_{TIP}$ node for controlling the TIP signal line. The tip control circuit 221 includes transistors QT1, QT2, and QT3, capacitor CT1, and resistors RT1, RT2, and RT3. In an embodiment, the tip control signals TPP and TPN are received at an emitter terminal of transistors QT1 and QT2, respectively. The tip control circuit 221 is also coupled to capacitors CTL for line capacitance compensation. Resistor R11 is coupled between output terminal TVE and an emitter of QT3 in the tip control circuit 221. In an embodiment, the subscriber line control circuit 210 includes output terminals RIP and RIN for providing ring control signals. In a specific embodiment, the ring control signals RIP and RIN are received by ring control circuit 222, which is coupled to the $N_{RING}$ node for controlling the RING signal line. In an embodiment, ring control circuit 222 includes transistors QR1, QR2, and QR3, capacitor CR1, and resistors RR1, RR2 and RR3. In an embodiment, the ring control signals RIP and RIN are received at an emitter terminal of transistors QR1 and QR2, respectively. The ring control circuit 222 is also coupled to capacitors CRL for line capacitance compensation. Resistor R12 is coupled between output terminal RVE and an emitter of QR3 in the ring control circuit 222. In an embodiment, SLCC 210 includes a terminal BAT for communication with a VBAT signal through resistor R10. In an embodiment, VBAT is a supply voltage for the high voltage linefeed circuit. In an example, VBAT can be provided by an external power source. In another example, the SLCC includes an on-chip DCDC controller which can be used to control VBAT. As shown in FIG. 2a, VBAT is connected to resistors RR2, RR3, RT2, RT3, and R10, and capacitors CR1 and CT1. Of course, there can be other variations, modifications, and alternatives.

As discussed above, in a specific embodiment, the subscriber line control circuit 210 also includes terminals VBT and VBR, which provide voltage signals to tip control circuit 221 and ring control circuit 222, respectively. As shown in FIG. 2a, a base terminal of linefeed transistors QT1 receives a voltage control signal from terminal VBT of the SLCC 210. Similarly, a base terminal of linefeed transistors QR1 receives a second voltage control signal from terminal VBR of the SLCC 210. In an embodiment, the currents through transistors QR1 and QT1 are proportional to the voltage across resistors RRE or RTE, respectively. In a specific embodiment, resistors RRE or RTE are coupled to a reference voltage VREF. In a specific embodiment, VREF is an external reference voltage. In such embodiment, the currents through transistors QR1 and QT1 are supplied predominantly by the external reference voltage VREF, whereas voltage signals VBR and VBT from SLCC 210 are used to control the current through transistors QR1 and QT1, respectively. This specific embodiment offers many advantages. For example, the SLCC does not need to supply large currents to the linefeed circuit. In conventional design, these current may be in the order of 20-80 mA. According to an embodiment of the present invention, current consumption of the integrated circuit is reduced and large integrated driver circuits can be avoided. As a result, integrated circuit heat sinks are not needed. In an example, VREF can be derived from a power supply voltage. In a particular example, VREF is equal to the supply voltage in magnitude. Of course, there can be other variations, modifications, and alternatives.

As discussed above, in a specific embodiment, fuses FT and FR are provided in the linefeed circuit 220 as shown in FIG. 2a. A faulty condition in the subscriber loop can cause either or both fuses to be blown. In an embodiment, the present invention provides a method for remote detection of the faulty condition using the signal conversion circuit 223. As shown in FIG. 2a, nodes $N_{TIP}$ and $N_{RING}$ receive tip and ring control signals from the tip control circuit 221 and ring control circuit 222, respectively. Under a typical operating condition, the signals at nodes $N_{TIP}$ and $N_{RING}$ are coupled to the TIP and RING signal lines of the subscriber loop. If either or both of the fuses FT and FR are blown, the TIP or RING lines of the subscriber loop can not receive these signals. In a specific embodiment, the signal conversion circuit 223 provides common-mode and differential mode feedback signals $S_{COM}$ and $S_{DIFF}$ which can be used to determine whether either or both fuses FT and FR are blown. In this embodiment, resistor RD4 is coupled between a base terminal of transistor QD1 and node $N_{TIP}$, and resistor RD2 is coupled between an emitter terminal of QD1 and the RING signal line on the outside of fuse FR. Similarly, resistor RD3 is coupled between a base terminal of transistor QD2 and node $N_{RING}$, and resistor RD1 is coupled between an emitter terminal of QD2 and the TIP signal line on the outside of fuse FT. Under a faulty condition, for example, if fuse FT is blown, the emitter terminal of transistor QD2, coupled to the blown fuse FT through resistor RD1, does not receive the expected signal at node $N_{TIP}$, causing an erroneous differential mode signal $S_{DIFF}$. On the other hand, the expected common-mode signal $S_{COM}$ associated with the signals on nodes $N_{TIP}$ and $N_{RING}$ is still available through resistors R13 and R14. By examining the common-mode and differential mode signals, the SLCC 210 can determine that the TIP line of the subscriber loop has a faulty condition. Similarly, a faulty condition in the RING line of the subscriber loop can also be detected.

According to embodiments of the present invention, subscriber line interface circuit (SLIC) 200 can be implemented in various circuit configurations. For example, on a specific embodiment, subscriber line control circuit (SLCC) 210 is implemented in an integrated circuit, and linefeed circuit 220 may be implemented using discrete components. In another embodiment, the SLCC is implemented in an integrated circuit and the linefeed circuit is implemented in a second integrated circuit. For example, the SLCC can be implemented in a CMOS integrated circuit. In another example, the linefeed circuit can be implemented in a bipolar integrated circuit. In an alternative embodiment, the SLCC and the linefeed circuit are implemented in a single integrated circuit, e.g. a BiCMOS integrated circuit. Of course, there can be other variations, modifications, and alternatives.

Although the above has been shown using a selected group of components for the subscriber line interface circuit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and the drawings.

Figure 3A:
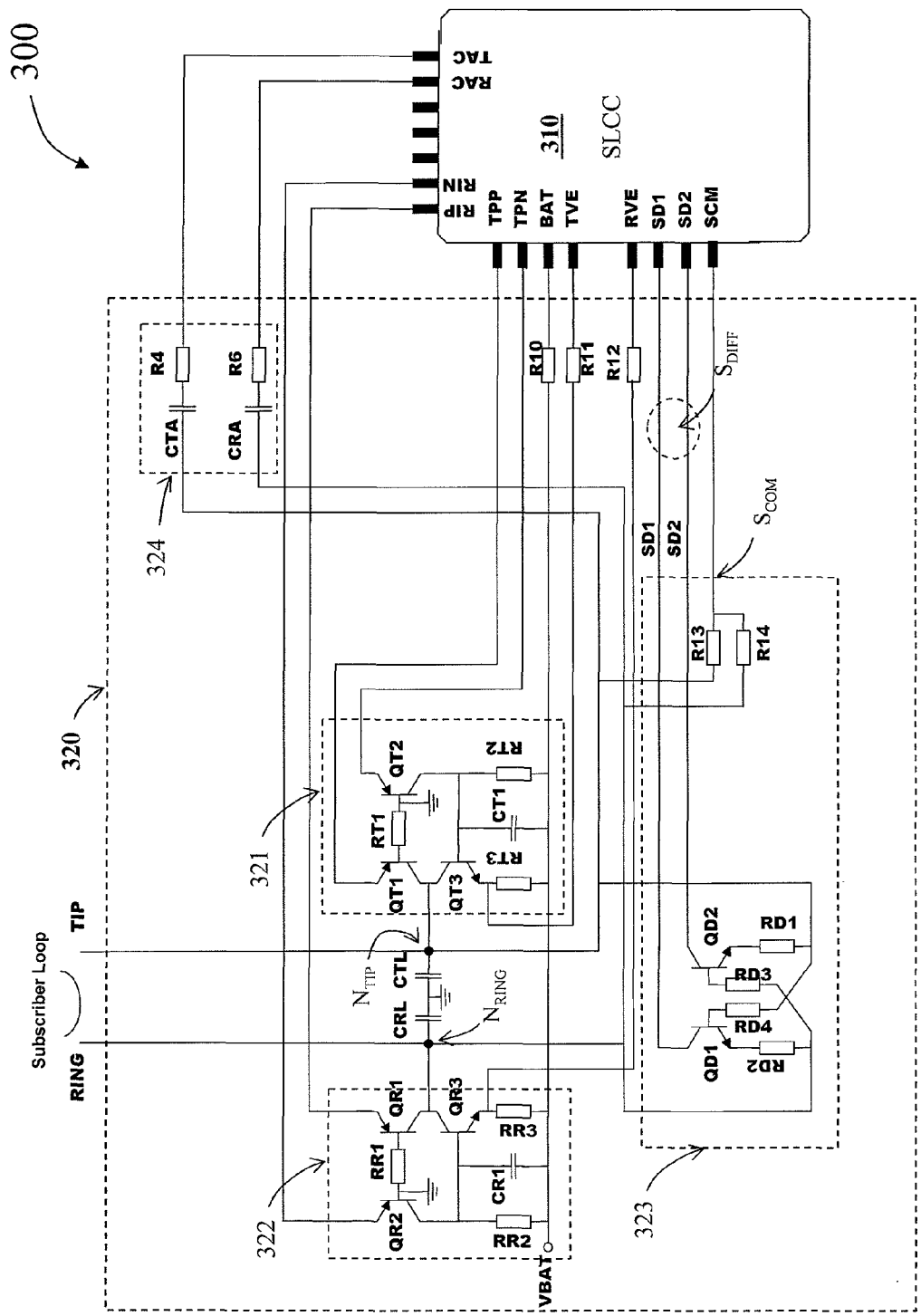
FIG. 3a is a simplified block diagram of a subscriber line interface circuit (SLIC) according to yet another embodiment of the present invention.

FIG. 3a is a simplified block diagram of a subscriber line interface circuit (SLIC) 300 according to another embodiment of the present invention. This diagram is merely an example, which should not unduly limit the scope of the claims herein. One of ordinary skill in the art would recognize other variations, modifications, and alternatives. As shown, SLIC circuit 300 includes a subscriber loop control circuit (SLCC) 310 and a linefeed circuit 320. The linefeed circuit 320 includes TIP control circuit 321, RING control circuit 322, a signal conversion circuit 323, and a filter circuit 324. In an embodiment, linefeed circuit 320 includes circuit nodes $N_{TIP}$ and $N_{RING}$. Node $N_{TIP}$ is coupled to a signal line to receive a tip signal TIP from the subscriber loop. Node $N_{RING}$ is coupled to a second signal line to receive a ring signal RING from the subscriber loop.

As shown in FIG. 3a, signal conversion circuit 323 provides a common mode signal $S_{COM}$ and a differential mode signal $S_{DIFF}$ in response to the tip signal TIP and the ring signal RING of the subscriber loop. In a specific embodiment, the signal conversion circuit 323 includes a resistor R13 coupled between node $N_{TIP}$ and common mode signal $S_{COM}$, and a second resistor R14 between node $N_{RING}$ and common mode signal $S_{COM}$. In a specific embodiment, the common-mode signal $S_{COM}$ is proportional to a sum of the subscriber loop tip and ring voltages. In an embodiment, signal conversion circuit 323 includes transistors QD1 and QD2, and resistors RD1, RD2, RD3, and RD4 as shown in FIG. 3a. In an embodiment, the differential mode signal $S_{DIFF}$ is provided across a first differential signal line SD1 and a second differential signal line SD2 as shown in FIG. 3a. In a specific example, transistors QD1 and QD2 are bipolar transistors. As shown, resistor RD4 is coupled between a base terminal of QD1 and node $N_{TIP}$, and resistor RD3 is coupled between a base terminal of QD2 and node $N_{RING}$. In a specific embodiment, resistor RD2 is coupled between an emitter terminal of QD1 and the ring signal RING from the subscriber loop, and resistor RD1 is coupled between an emitter terminal of QD2 and the tip signal TIP from the subscriber loop. In the embodiment shown in FIG. 3a, differential mode signal $S_{DIFF}$ is provided across signal lines SD1 and SD2, which are coupled to a collector terminal of transistor QD1 and a collector terminal of transistor QD2, respectively. In an embodiment, differential mode signal $S_{DIFF}$ is proportional to a difference between the tip signal and the ring signal. Of course, there can be other variations, modifications, and alternatives. For example, in an alternative embodiment, the emitter terminal of QD1 and the base terminal of QD2 are both coupled to node $N_{RING}$, and an emitter terminal of QD2 and a base terminal of QD1 are both coupled to node $N_{TIP}$).

As shown in FIG. 3a, linefeed circuit 320 includes a filter circuit 324, which includes capacitor CRA and resistor R6 connected in series to provide an audio band signal input terminal RAC of SLCC 310. Similarly, filter circuit 324 includes capacitor CTA and resistor R4 connected in series to provide an audio band signal to input terminal TAC of SLCC 310. In some embodiments of the present invention, audio band includes a frequency range of about 20 Hz to 20,000 Hz, and voice band has a frequency range of about 300 Hz to 3,400 Hz.

Figure 3B:
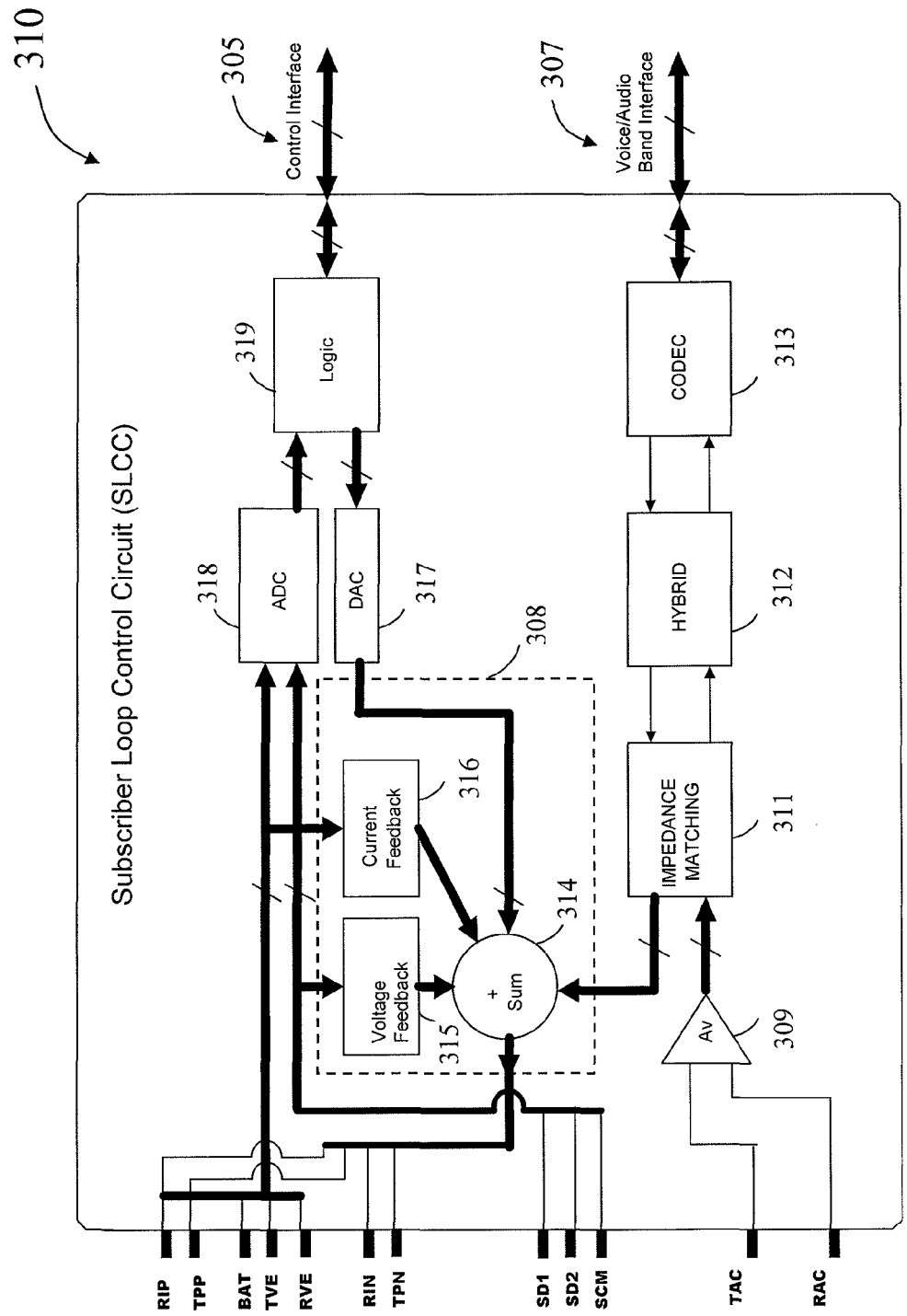
FIG. 3b is a simplified block diagram of a subscriber line control circuit (SLCC) according to another embodiment of the present invention.

FIG. 3b is a simplified block diagram of a subscriber line control circuit (SLCC) 310 according to an embodiment of the present invention. This diagram is merely an example, which should not unduly limit the scope of the claims herein. One of ordinary skill in the art would recognize other variations, modifications, and alternatives. As shown, the subscriber line control circuit 310 includes amplifier circuit 309, impedance matching circuit 311, hybrid circuit block 312, and programmable codec 313. In an embodiment, SLCC 310 also includes analog control circuit 308, digital-to-analog converter circuit (DAC) 317, analog-to-digital circuit (ADC) 318, and logic circuit 319. In a specific embodiment, analog control circuit 308 includes a summation circuit 314, analog voltage feedback circuit 315, and current feedback circuit 316. In an embodiment, the subscriber line control circuit 310 includes input terminals RAC and TAC for receiving voice band or audio band signals from the linefeed circuit 320. In some embodiments, these circuit blocks together implement many of the BORSCHT functions. For example the amplifier 309 receives AC voice band or audio band signals from the linefeed circuit 320. The impedance matching circuit 311 matches the characteristic impedance of the subscriber line. In an embodiment, the hybrid circuit 312 performs 2-wire to 4-wire conversion. The codec 313 performs coding and decoding functions for the voice or audio band signals. In a preferred embodiment, the SLCC is provided in a single integrated circuit chip. Of course, there can be other variations, modifications, and alternatives.

In a specific embodiment, SLCC 310 includes an input SCM for receiving the common mode signal $S_{COM}$ from the linefeed circuit, and also includes inputs SD1 and SD2 for receiving the differential mode signal $S_{DIFF}$ from the linefeed circuit. As shown in FIGS. 3a and 3b, the SLCC 310 is isolated from the tip signal TIP and the ring signal RING by the signal conversion circuit 323 in the linefeed circuit. In other words, SLCC 310 does not sense the tip signal or the ring signal according to embodiments of the present invention. In contrast, SLCC 310 receives a differential mode signal and a common mode signal, and can be relatively independent from the instabilities of the tip and ring signals.

As shown in FIG. 3*b*, in an embodiment, SLCC 310 includes output terminals TPP and TPN for providing tip control current signals. Similarly, SLCC 310 includes output terminals RIP and RIN for providing ring control current signals. These tip and ring control current signals are provided by the analog control circuit 308 in response to at least the common mode signal $S_{COM}$ and differential mode signal $S_{DIFF}$ from the linefeed circuit 320, and signals derived from the control interface 305 and voice/audio band interface 307. In an embodiment, the control interface 305 and the Voice band and/or audio band interface 307 are coupled to a digital communication network. For example, the digital communication network can be found in a central office of a telephone service provider, cable television networks, fiber optic, Ethernet port interface to the Internet, VoIP, or wireless local loop, etc. Of course, there can be other variations, modifications, and alternatives.

Referring back to FIG. 3*a*, in a specific embodiment, the tip control signals TPP and TPN are received by tip control circuit 321, which is coupled to the $N_{TIP}$ node for controlling the TIP signal line. The tip control circuit 321 includes transistors QT1, QT2, and QT3, capacitor CT1, and resistors RT1, RT2, and RT3. In an embodiment, the tip control signals TPP and TPN are received at an emitter terminal of transistors QT1 and QT2, respectively. The tip control circuit 321 is also coupled to capacitors CTL for line capacitance compensation. Resistor R11 is coupled between output terminal TVE and an emitter of QT3 in the tip control circuit 321. In an embodiment, the subscriber line control circuit 310 includes output terminals RIP and RIN for providing ring control signals. In a specific embodiment, the ring control signals RIP and RIN are received by ring control circuit 322, which is coupled to the $N_{RING}$ node for controlling the RING signal line. In an embodiment, ring control circuit 322 includes transistors QR1, QR2, and QR3, capacitor CR1, and resistors RR1, RR2 and RR3. In an embodiment, the ring control signals RIP and RIN are received at an emitter terminal of transistors QR1 and QR2, respectively. The ring control circuit 322 is also coupled to capacitors CRL for line capacitance compensation. Resistor R12 is coupled between output terminal RVE and an emitter of QR3 in the ring control circuit 322. In an embodiment, SLCC 310 includes a terminal BAT for communication with a VBAT signal through resistor R10. In an embodiment, VBAT is a supply voltage for the high voltage linefeed circuit. In an example, VBAT can be provided by an external power source. In another example, the SLCC includes an on-chip DCDC controller which can be used to control VBAT. As shown in FIG. 3*a*, VBAT is connected to resistors RR2, RR3, RT2, RT3, and R10, and capacitors CR1 and CT1. Of course, there can be other variations, modifications, and alternatives.

According to embodiments of the present invention, subscriber line interface circuit (SLIC) 300 can be implemented in various circuit configurations. For example, in a specific embodiment, subscriber line control circuit (SLCC) 310 is implemented in an integrated circuit, and linefeed circuit 320 may be implemented using discrete components. In another embodiment, the SLCC is implemented in an integrated circuit, and the linefeed circuit is implemented in a second integrated circuit. For example, the SLCC can be implemented in a CMOS integrated circuit. In another example, the linefeed circuit can be implemented in a bipolar integrated circuit. In an alternative embodiment, the SLCC and the linefeed circuit are implemented in a single integrated circuit, e.g. a BiCMOS integrated circuit. Of course, there can be other variations, modifications, and alternatives.

Although the above has been shown using a selected group of components for the subscriber line interface circuit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and the drawings.

Figure 4:
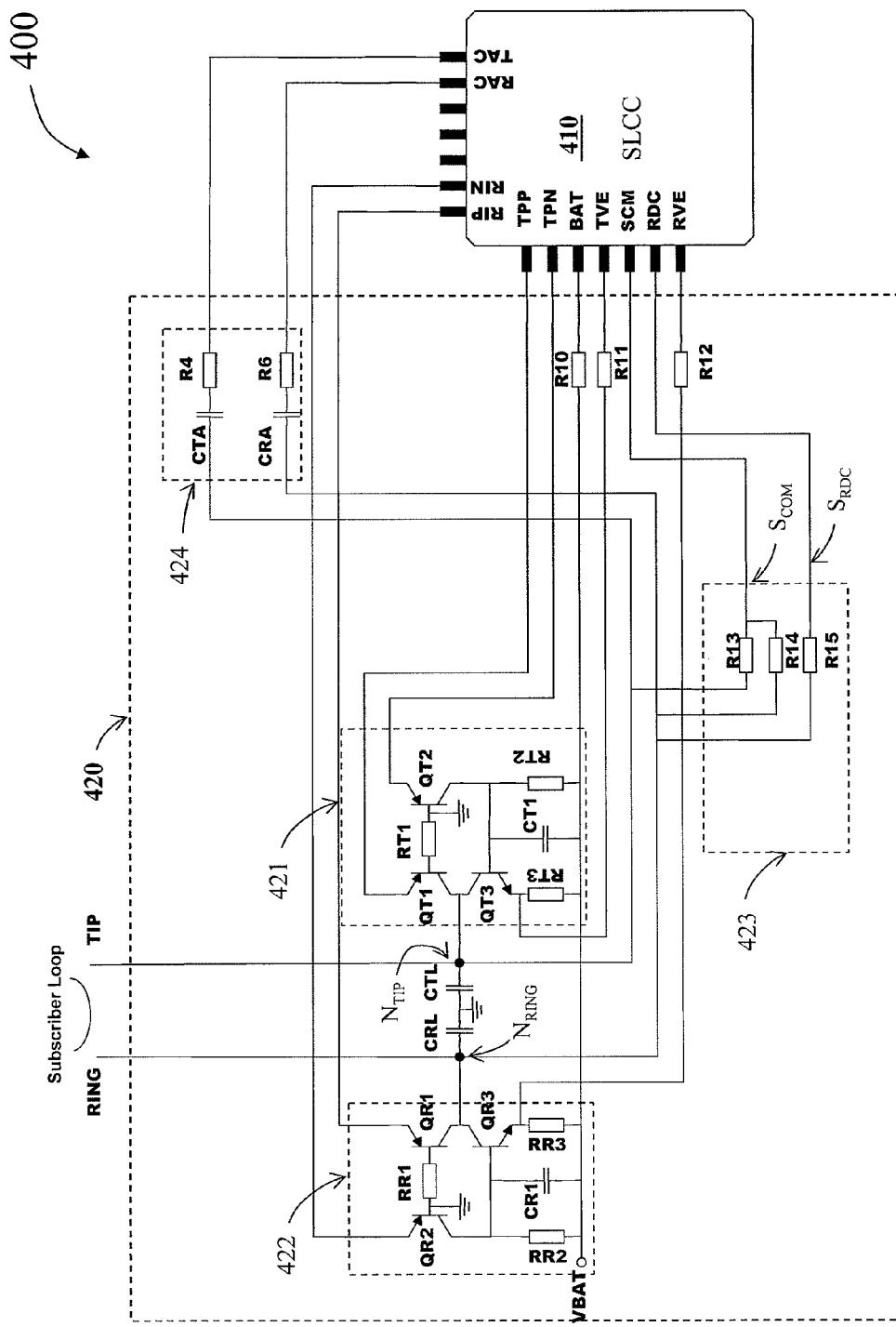
FIG. 4 is a simplified block diagram of a subscriber line interface circuit (SLIC) according to an alternative embodiment of the present invention.

FIG. 4 is a simplified block diagram of a subscriber line interface circuit (SLIC) 400 according to yet another embodiment of the present invention. This diagram is merely an example, which should not unduly limit the scope of the claims herein. One of ordinary skill in the art would recognize other variations, modifications, and alternatives. As shown, SLIC circuit 400 includes a subscriber loop control circuit (SLCC) 410 and a linefeed circuit 420. The linefeed circuit 420 includes TIP control circuit 421, RING control circuit 422, a signal conversion circuit 423, and a filter circuit 424. In an embodiment, linefeed circuit 420 includes circuit nodes $N_{TIP}$ and $N_{RING}$. Node $N_{TIP}$ is coupled to a signal line to receive a tip signal TIP from the subscriber loop. Node $N_{RING}$ is coupled to a second signal line to receive a ring signal RING from the subscriber loop. As shown in FIG. 4, signal conversion circuit 423 provides a common mode signal $S_{COM}$ and direct coupled ring signal $S_{RDC}$ in response to the tip signal TIP and the ring signal RING of the subscriber loop. In an embodiment, the common-mode signal $S_{COM}$ is coupled with the TIP signal through resistor R13, and $S_{COM}$ is coupled with the RING signal through resistor R14. In a specific embodiment, the common-mode signal $S_{COM}$ is proportional to a sum of the subscriber loop tip and ring voltages. In an embodiment, direct coupled ring signal $S_{RDC}$ is derived from the RING signal through resistors R15 as shown in FIG. 4. In a specific embodiment, subscriber line control circuit (SLCC) 410 includes an input RDC configured to receive the direct coupled ring signal $S_{RDC}$ from the linefeed circuit. Of course, there can be other variations, modifications, and alternatives.

As shown in FIG. 4, linefeed circuit 420 includes a filter circuit 424, which includes capacitor CRA and resistor R6 connected in series to provide an AC ring signal to input terminal RAC of SLCC 410. Similarly, filter circuit 424 includes capacitor CTA and resistor R4 connected in series to provide an AC tip signal to input terminal TAC of SLCC 410. In an embodiment, the AC tip and ring signals include voice/audio band signals.

In a specific embodiment, SLCC 410 includes an input SCM for receiving the common mode signal $S_{COM}$ from the linefeed circuit and input RDC for receiving the direct coupled ring signal $S_{RDC}$ from the linefeed circuit. As shown in FIG. 4, in an embodiment, SLCC 410 includes output terminals TPP and TPN for providing tip control current signals. Similarly, SLCC 410 includes output terminals RIP and RIN for providing ring control current signals. These tip and ring control current signals are provided by an analog control circuit (not shown) in response to at least the common mode signal $S_{COM}$ and the direct coupled ring signal $S_{RDC}$ from the linefeed circuit 420. In a specific embodiment, SLCC 410 also includes circuit blocks not shown in FIG. 4, such as analog control circuit, analog-to-digital converter, logic circuit, amplifier circuit, impedance matching circuit, hybrid circuit, and codec circuit. For example the amplifier receives AC voice band or audio band signals from the linefeed circuit. The impedance matching circuit matches the characteristic impedance of the signals to and from the linefeed circuit. The hybrid circuit performs 2-wire to 4-wire conversion. The codec performs signal conversion for the voice or audio band. In an embodiment, these circuit blocks together implements many of the BORSCHT functions. Of course, there can be other variations, modifications, and alternatives.

In FIG. 4, the tip control signals TPP and TPN are received by tip control circuit 421, which is coupled to the $N_{TIP}$ node for controlling the TIP signal line. The tip control circuit 421 includes transistors QT1, QT2, and QT3, capacitor CT1, and resistors RT1, RT2, and RT3. In an embodiment, the tip control signals tip control signals TPP and TPN are received at an emitter terminal of transistors QT1 and QT2 respectively. The linefeed circuit also includes resistors, R10 and R11, and capacitors CTL for tip line control. In an embodiment, the subscriber line control circuit 410 includes output terminals RIP and RIN for providing ring control signals. In a specific embodiment, the ring control signals RIP and RIN are received by ring control circuit 422, which is coupled to the $N_{RING}$ node for controlling the RING signal line. In an embodiment, ring control circuit 422 includes transistors QR1, QR2, and QR3, capacitor CR1, and resistors RR1, RR2 and RR3. In an embodiment, the ring control signals RIP and RIN are received at an emitter terminal of transistors QR1 and QR2, respectively. The linefeed circuit also includes resistors, R10 and R12, and capacitors CRL for ring line control. In an embodiment, SLCC 410 includes a terminal BAT for communication with a VBAT signal through resistor R10. In an embodiment, VBAT is a supply voltage for the high voltage line driver. In an example, VBAT can be provided by an external power source. In another example, the SLCC includes an on-chip DCDC controller which can be used to control VBAT. As shown in FIG. 4, VBAT is connected to resistors RR2, RR3, RT2, and RT3, and capacitors CR1 and CT1. Of course, there can be other variations, modifications, and alternatives.

According to embodiments of the present invention, a subscriber line interface circuit (SLIC), e.g. 400, can be implemented in various circuit configurations. For example, on a specific embodiment, a subscriber line control circuit (SLCC), such as 410, is implemented in an integrated circuit and a linefeed circuit, such as 420, may be implemented using discrete components. In another embodiment, the subscriber line control circuit is implemented in an integrated circuit and the linefeed circuit is implemented in a second integrated circuit. For example, the subscriber line control circuit can be implemented in a CMOS integrated circuit. In another example, the linefeed circuit can be implemented in a bipolar integrated circuit. In an alternative embodiment, the subscriber line control circuit and the linefeed circuit are implemented in a single integrated circuit, e.g. a BiCMOS integrated circuit. Of course, there can be other variations, modifications, and alternatives.

Figure 5A:
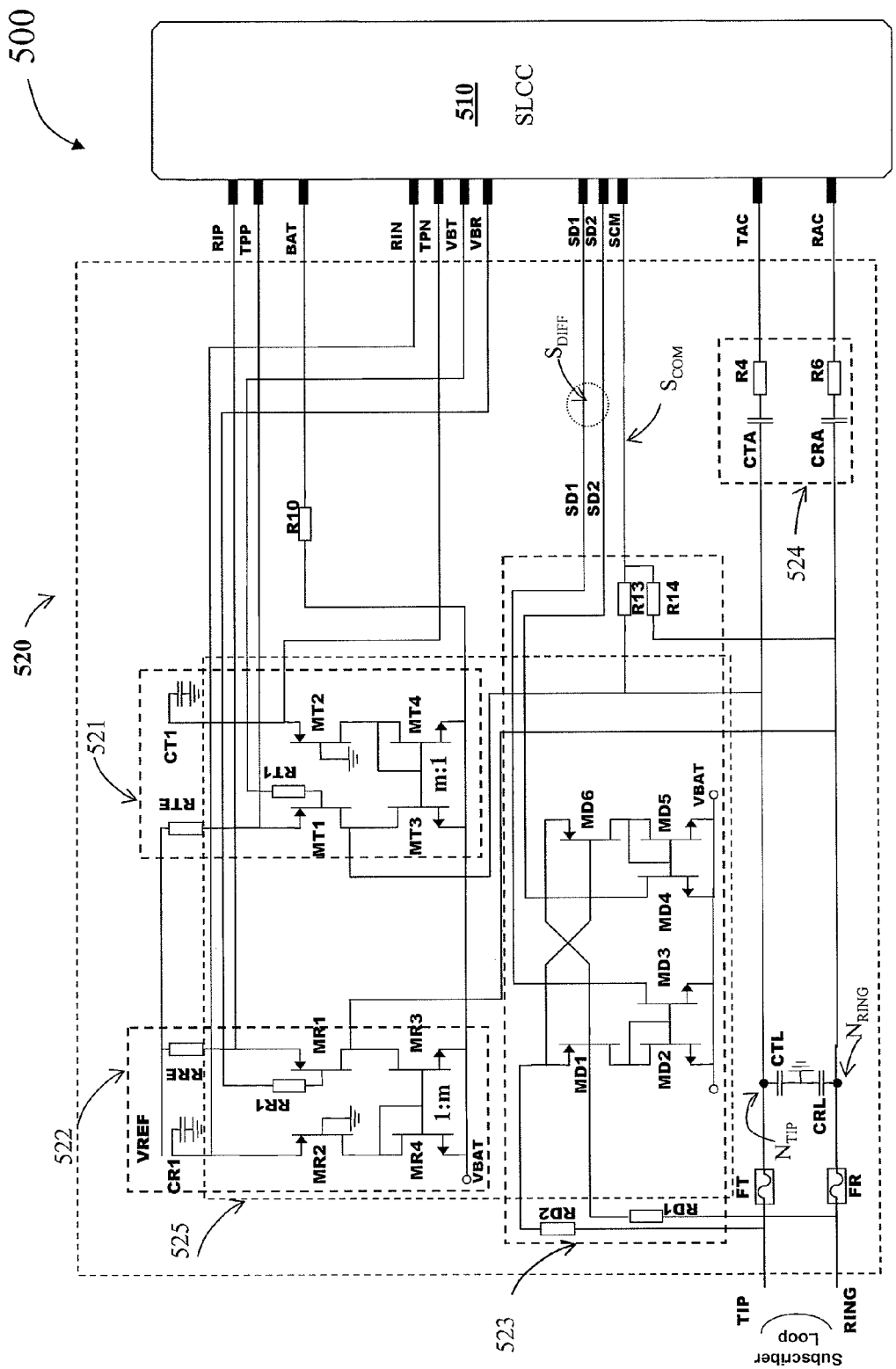
FIG. 5a is a simplified block diagram of a subscriber line interface circuit (SLIC) according to an another embodiment of the present invention.

FIG. 5a is a simplified block diagram of a subscriber line interface circuit (SLIC) 500 according to another embodiment of the present invention. This diagram is merely an example, which should not unduly limit the scope of the claims herein. One of ordinary skill in the art would recognize other variations, modifications, and alternatives. As shown, SLIC circuit 500 includes a subscriber loop control circuit (SLCC) 510 and a linefeed circuit 520. The linefeed circuit 520 includes TIP control circuit 521, RING control circuit 522, a signal conversion circuit 523, and a filter circuit 524. In an embodiment, linefeed circuit 520 includes circuit nodes $N_{up}$ and $N_{RING}$. Node $N_{TIP}$ is coupled to a signal line to receive a tip signal TIP from the subscriber loop. Node $N_{RING}$ is coupled to a second signal line to receive a ring signal RING from the subscriber loop. In a specific embodiment, the linefeed circuit 520 also includes a fuse FT coupled between node $N_{TIP}$ and tip signal TIP from the subscriber loop, and a second fuse FR and coupled between node $N_{RING}$ and ring signal RING from the subscriber loop. In an alternative embodiment, fuses FT and FR can be omitted.

As shown in FIG. 5a, signal conversion circuit 523 provides a common mode signal $S_{COM}$ and a differential mode signal $S_{DIFF}$ in response to the tip signal TIP and the ring signal RING of the subscriber loop. In a specific embodiment, the signal conversion circuit 523 includes a resistor R13 coupled between node $N_{TIP}$ and common mode signal $S_{COM}$, and a second resistor R14 between node $N_{RING}$ and common mode signal $S_{COM}$. In a specific embodiment, the common-mode signal $S_{COM}$ is proportional to a sum of the subscriber loop tip and ring voltages. In an embodiment, signal conversion circuit 523 includes transistors MD1, MD2, MD3, MD4, MD5 and MD6, and resistors RD1, RD2 as shown in FIG. 5a. In an embodiment, the differential mode signal is provided across a first differential signal line SD1 and a second differential signal line SD2 as shown in FIG. 5a. In a specific example, transistors MD1 through MD6 are MOSFET transistors. In the example shown in FIG. 5a, MOSFETs MD1 and MD6 are in a cross-coupled configuration. As shown, resistor RD1 is coupled between RING and a source terminal of MD6, and resistor RD2 is coupled between TIP and a source terminal of MD1, while the source of MD1 is coupled to the gate of MD6 and the source of MD6 is coupled to the gate of MD1. In a specific embodiment, the differential subscriber loop signal generated through MD1, MD6, RD1 & RD2 is mirrored by MOSFETs MD2, MD3, MD4, MD5 in order to feed into the SLCC. In the embodiment shown in FIG. 5a, differential mode signal $S_{DIFF}$ is provided across signal lines SD1 and SD2, which are coupled to a drain terminal of transistor MD3 and a drain terminal of transistor MD4, respectively. In an embodiment, differential mode signal $S_{DIFF}$ is proportional to a difference between the tip signal and the ring signal. Of course, there can be other variations, modifications, and alternatives. For example, MD1 and MD6 are N-type MOSFETs that can be hooked up with their drain terminals to SD1 & SD2, without mirroring the signal.

As shown in FIG. 5a, linefeed circuit 520 includes a filter circuit 524, which includes capacitor CRA and resistor R6 connected in series to provide an audio band signal input terminal RAC of SLCC 510. Similarly, filter circuit 524 includes capacitor CTA and resistor R4 connected in series to provide an audio band signal to input terminal TAC of SLCC 510. In some embodiments of the present invention, audio band includes a frequency range of about 20 Hz to 20,000 Hz, and voice band has a frequency range of about 300 Hz to 3,400 Hz.

Figure 5B:
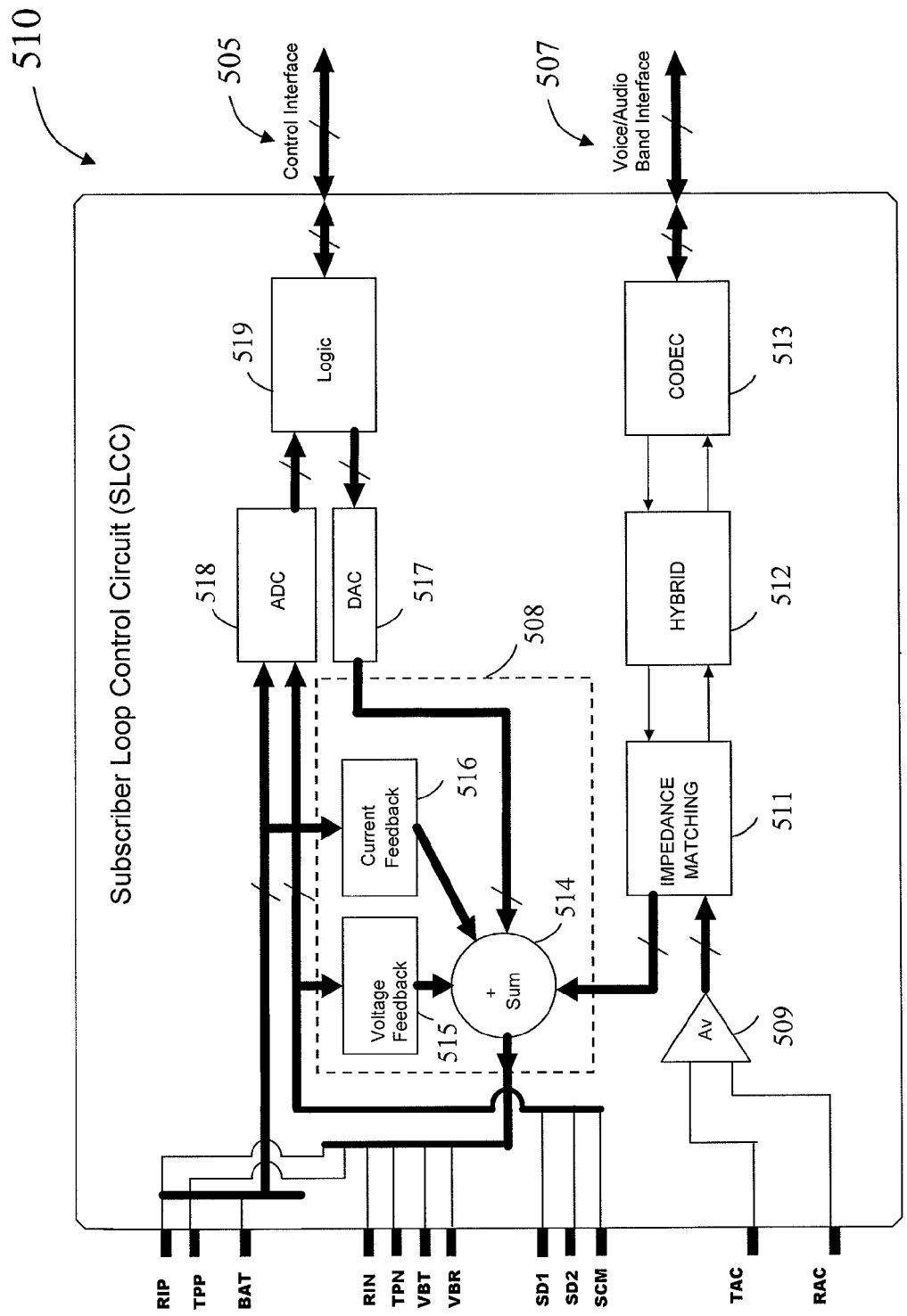
FIG. 5b is a simplified block diagram of a subscriber line control circuit (SLCC) according to an embodiment of the present invention.

FIG. 5b is a simplified block diagram of a subscriber line control circuit (SLCC) 210 according to an embodiment of the present invention. This diagram is merely an example, which should not unduly limit the scope of the claims herein. One of ordinary skill in the art would recognize other variations, modifications, and alternatives. As shown, the subscriber line control circuit 510 includes amplifier circuit 509, impedance matching circuit 511, hybrid circuit block 512, and programmable codec 513. In an embodiment, SLCC 510 also includes analog control circuit 508, digital-to-analog converter circuit (DAC) 517, analog-to-digital circuit (ADC) 518, and logic circuit 519. In a specific embodiment, analog control circuit 508 includes a summation circuit 514, analog voltage feedback circuit 515, and current feedback circuit 516. In an embodiment, the subscriber line control circuit 510 includes input terminals RAC and TAC for receiving voice band or audio band signals from the linefeed circuit 520. In some embodiments, these circuit blocks together implement many of the BORSCHT functions. For example the amplifier 509 receives AC voice band or audio band signals from the linefeed circuit 520. The impedance matching circuit 511 matches the characteristic impedance of the subscriber line. In an embodiment, the hybrid circuit 512 performs 2-wire to 4-wire conversion. The codec 513 performs coding and decoding functions for the voice or audio band signals. In a preferred embodiment, the SLCC is provided in a single integrated circuit chip. Of course, there can be other variations, modifications, and alternatives.

In a specific embodiment, SLCC 510 includes an input SCM for receiving the common mode signal $S_{COM}$ from the linefeed circuit, and also includes inputs SD1 and SD2 for receiving the differential mode signal $S_{DIFF}$ from the linefeed circuit. As shown in FIGS. 5a and 5b, the SLCC 510 is isolated from the tip signal TIP and the ring signal RING by the signal conversion circuit 223 in the linefeed circuit. In other words, SLCC 210 does not sense the tip signal or the ring signal according to embodiments of the present invention. In contrast, SLCC 210 receives a differential mode signal and a common mode signal, and can be relatively independent from the instabilities of the tip and ring signals.

As shown in FIG. 5b, in an embodiment, SLCC 210 includes output terminals TPP and TPN for providing tip control current signals. Similarly, SLCC 210 includes output terminals RIP and RIN for providing ring control current signals. In a specific embodiment, the subscriber line control circuit 510 also includes terminals VBT and VBR for providing tip and ring control voltage signals, respectively. These tip and ring control current and voltage signals are provided by the analog control circuit 508 in response to at least the common mode signal $S_{COM}$ and differential mode signal $S_{DIFF}$ from the linefeed circuit 520, and signals derived from the control interface 505 and voice/audio band interface 507. In an embodiment, the control interface 505 and the Voice band and/or audio band interface 507 are coupled to a digital communication network. For example, the digital communication network can be found in a central office of a telephone service provider, cable television networks, fiber optic, Ethernet port interface to the Internet, VoIP, or wireless local loop, etc. Of course, there can be other variations, modifications, and alternatives.

Referring back to FIG. 5a, in a specific embodiment, the tip control signals VBT and TPN are received by tip control circuit 521, which is coupled to the $N_{TIP}$ node for controlling the TIP signal line. The tip control circuit 521 includes transistors MT1, MT2, MT3 and MT4, capacitor CT1, and resistor RT1. In an embodiment, the tip control signals VBT and TPN are received at the gate terminal of transistor MT1 and the source terminal of MT2, respectively. The tip control circuit 521 is also coupled to capacitors CTL for line capacitance compensation. In an embodiment, the subscriber line control circuit 510 includes output terminals VBR and RIN for providing ring control signals. In a specific embodiment, the ring control signals VBR and RIN are received by ring control circuit 522, which is coupled to the $N_{RING}$ node for controlling the RING signal line. In an embodiment, ring control circuit 522 includes transistors MR1, MR2, MR3 and MR4, capacitor CR1, and resistor RR1. In an embodiment, the ring control signals VBR and RIN are received at the gate terminal of transistor MR1 and the source terminal of MR2, respectively. The ring control circuit 522 is also coupled to capacitors CRL for line capacitance compensation. In an embodiment, SLCC 510 includes a terminal BAT for communication with a VBAT signal through resistor R10. In an embodiment, VBAT is a supply voltage for the high voltage linefeed circuit. In some embodiments, the magnitude of VBAT can be 100 volts or higher. In an example, VBAT can be provided by an external power source. In another example, the SLCC includes an on-chip DCDC controller which can be used to control VBAT. As shown in FIG. 5a, VBAT is connected to three current mirrors. Of course, there can be other variations, modifications, and alternatives.

As discussed above, in a specific embodiment, the subscriber line control circuit 510 also includes terminals VBT and VBR, which provide voltage signals to tip control circuit 521 and ring control circuit 522, respectively. As shown in FIG. 5a, a gate terminal of linefeed transistors MT1 receives a voltage control signal from terminal VBT of the SLCC 510. Similarly, a gate terminal of linefeed transistors MR1 receives a second voltage control signal from terminal VBR of the SLCC 510. In an embodiment, the currents through transistors MR1 and MT1 are proportional to the voltage across resistors RRE or RTE, respectively. In a specific embodiment, resistors RRE or RTE are coupled to a reference voltage VREF. In a specific embodiment, VREF is an external reference voltage. In such embodiment, the currents through transistors MR1 and MT1 are supplied predominantly by the external reference voltage VREF, whereas voltage signals VBR and VBT from SLCC 510 are used to control the current through transistors MR1 and MT1, respectively. This specific embodiment offers many advantages. For example, the SLCC does not need to supply large currents to the linefeed circuit. In conventional design, these current may be in the order of 20-80 mA. According to an embodiment of the present invention, current consumption of the integrated circuit is reduced and large integrated driver circuits can be avoided. As a result, integrated circuit heat sinks are not needed. In an example, VREF can be derived from a power supply voltage. In a particular example, VREF is equal to the supply voltage in magnitude. Of course, there can be other variations, modifications, and alternatives.

Additionally, in the example of FIG. 5a, MOSFETs MT3 and MT4 form a current mirror with an m:1 current ratio. With a given current ratio, the control circuitry can be simplified. For example, fewer control signals are needed, and pin counts can be reduced. Similar advantages can be achieved with MOSFETs MR3 and MR4 forming a current mirror with an m:1 current ratio. The value for m can be selected to suit different applications. For example, in various embodiments, m can be 10 to 100.

In an embodiment, transistors MT2 and MR2 are couple to a ground terminal through capacitors CT1 and CR1, respectively, In some embodiments, a portion of linefeed circuit 520 may be integrated into an integrated circuit chip. As shown in FIG. 5a, a subscriber linefeed circuit (SLFC) 525 includes MOSFET transistors MT1-MT4 of tip control circuit 521, MOSFET transistors MR1-MR4 of ring control circuit 522, and MOSFET transistors MD1-MD6 of signal conversion circuit 523.

As discussed above, in a specific embodiment, fuses FT and FR are provided in the linefeed circuit 520 as shown in FIG. 5a. A faulty condition in the subscriber loop can cause either or both fuses to be blown. In an embodiment, the present invention provides a method for remote detection of the faulty condition using the signal conversion circuit 223. As shown in FIG. 5a, nodes $N_{TIP}$ and $N_{RING}$ receive tip and ring control signals from the tip control circuit 521 and ring control circuit 522, respectively. Under a typical operating condition, the signals at nodes $N_{TIP}$ and $N_{RING}$ are coupled to the TIP and RING signal lines of the subscriber loop. If either or both of the fuses FT and FR are blown, the TIP or RING lines of the subscriber loop can not receive these signals. In a specific embodiment, the signal conversion circuit 523 provides common-mode and differential mode feedback signals $S_{COM}$ and $S_{DIFF}$ which can be used to determine whether either or both fuses FT and FR are blown. In this embodiment, resistor RD1 is coupled between a gate terminal of transistor MD1 and node RING, and resistor RD2 is coupled between a gate terminal of MD6 and the TIP signal line on the outside of fuse FR. Under a faulty condition, for example, if fuse FT is blown, the gate terminal of transistor MD6, coupled to the blown fuse FT through resistor RD2, does not receive the expected signal at node TIP, causing an erroneous differential mode signal $S_{DIFF}$. On the other hand, the expected common-mode signal $S_{COM}$ associated with the signals on nodes $N_{TIP}$ and $N_{RING}$ is still available through resistors R13 and R14. By examining the common-mode and differential mode signals, the SLCC 510 can determine that the TIP line of the subscriber loop has a faulty condition. Similarly, a faulty condition in the RING line of the subscriber loop can also be detected.

According to embodiments of the present invention, subscriber line interface circuit (SLIC) 500 can be implemented in various circuit configurations. For example, on a specific embodiment, subscriber line control circuit (SLCC) 510 is implemented in an integrated circuit, and linefeed circuit 520 may be implemented using an integrated circuit 525. In another embodiment, the SLCC is implemented in an integrated circuit and the linefeed circuit is implemented in a second integrated circuit 525. For example, the SLCC can be implemented in a CMOS integrated circuit. In the examples described above, the linefeed circuit can be implemented in a high-voltage MOS chip. In other examples, the linefeed circuit can be implemented in a bipolar, CMOS, BiCMOS or DMOS integrated circuit. In an alternative embodiment, the SLCC and the linefeed circuit are implemented in a single integrated circuit, e.g. a BiCMOS integrated circuit, or a CMOS integrated circuit including high-voltage transistors. Of course, there can be other variations, modifications, and alternatives.

Although the above has been shown using a selected group of components for the subscriber line interface circuit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and the drawings.

Figure 6A:
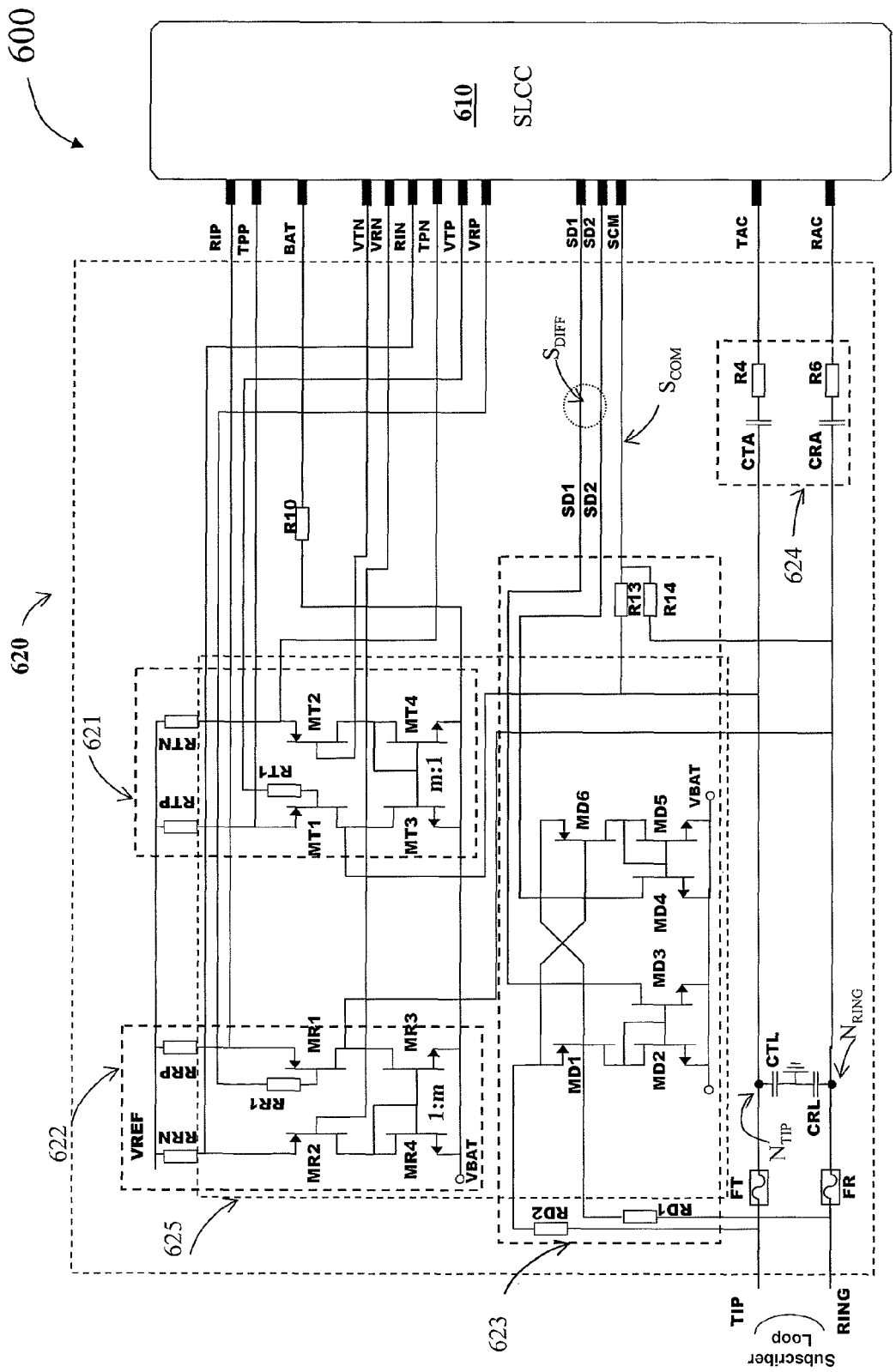
FIG. 6a is a simplified block diagram of a subscriber line interface circuit (SLIC) according to yet another embodiment of the present invention.

FIG. 6a is a simplified block diagram of a subscriber line interface circuit (SLIC) 600 according to another embodiment of the present invention. This diagram is merely an example, which should not unduly limit the scope of the claims herein. One of ordinary skill in the art would recognize other variations, modifications, and alternatives. As shown, SLIC circuit 300 includes a subscriber loop control circuit (SLCC) 610 and a linefeed circuit 620. The linefeed circuit 620 includes TIP control circuit 621, RING control circuit 622, a signal conversion circuit 623, and a filter circuit 624. In an embodiment, linefeed circuit 620 includes circuit nodes $N_{up}$ and $N_{RING}$. Node $N_{TIP}$ is coupled to a signal line to receive a tip signal TIP from the subscriber loop. Node $N_{RING}$ is coupled to a second signal line to receive a ring signal RING from the subscriber loop.

As shown in FIG. 6a, signal conversion circuit 623 provides a common mode signal $S_{COM}$ and a differential mode signal $S_{DIFF}$ in response to the tip signal TIP and the ring signal RING of the subscriber loop. In a specific embodiment, the signal conversion circuit 623 includes a resistor R13 coupled between node $N_{TIP}$ and common mode signal $S_{COM}$, and a second resistor R14 between node $N_{RING}$ and common mode signal $S_{COM}$. In a specific embodiment, the common-mode signal $S_{COM}$ is proportional to a sum of the subscriber loop tip and ring voltages. In an embodiment, signal conversion circuit 623 includes transistors MD1 through MD6, and resistors RD1, RD2 as shown in FIG. 6a. In an embodiment, the differential mode signal $S_{DIFF}$ is provided across a first differential signal line SD1 and a second differential signal line SD2 as shown in FIG. 6a. In a specific example, transistors MD1 through MD6 are MOSFET transistors. In the example shown in FIG. 6a, MOSFETs MD1 and MD6 are in a cross-coupled configuration. As shown, resistor RD1 is coupled between RING and a source terminal of MD6, and resistor RD2 is coupled between TIP and a source terminal of MD1, while the source of MD1 is coupled to the gate of MD6 and the source of MD6 is coupled to the gate of MD1 In a specific embodiment, the differential subscriber loop signal generated through MD1, MD6, RD1 & RD2 is mirrored by MOSFETs MD2, MD3, MD4, MD5 in order to feed into the SLCC. In the embodiment shown in FIG. 6a, differential mode signal $S_{DIFF}$ is provided across signal lines SD1 and SD2, which are coupled to a drain terminal of transistor MD3 and a drain terminal of transistor MD4, respectively. In an embodiment, differential mode signal $S_{DIFF}$ is proportional to a difference between the tip signal and the ring signal. Of course, there can be other variations, modifications, and alternatives. For example, MD1 and MD6 are N-type MOSFETs that can be hooked up with their drain terminals to SD1 & SD2, without mirroring the signal.

As shown in FIG. 6a, linefeed circuit 620 includes a filter circuit 624, which includes capacitor CRA and resistor R6 connected in series to provide an audio band signal input terminal RAC of SLCC 610. Similarly, filter circuit 624 includes capacitor CTA and resistor R4 connected in series to provide an audio band signal to input terminal TAC of SLCC 610. In some embodiments of the present invention, audio band includes a frequency range of about 20 Hz to 20,000 Hz, and voice band has a frequency range of about 300 Hz to 3,400 Hz.

In some embodiments, a portion of linefeed circuit 620 may be integrated into an integrated circuit chip. As shown in FIG. 6a, a subscriber linefeed circuit (SLFC) 625 includes MOSFET transistors MT1-MT4 of tip control circuit 621, MOSFET transistors MR1-MR4 of ring control circuit 622, and MOSFET transistors MD1-MD6 of signal conversion circuit 623.

Figure 6B:
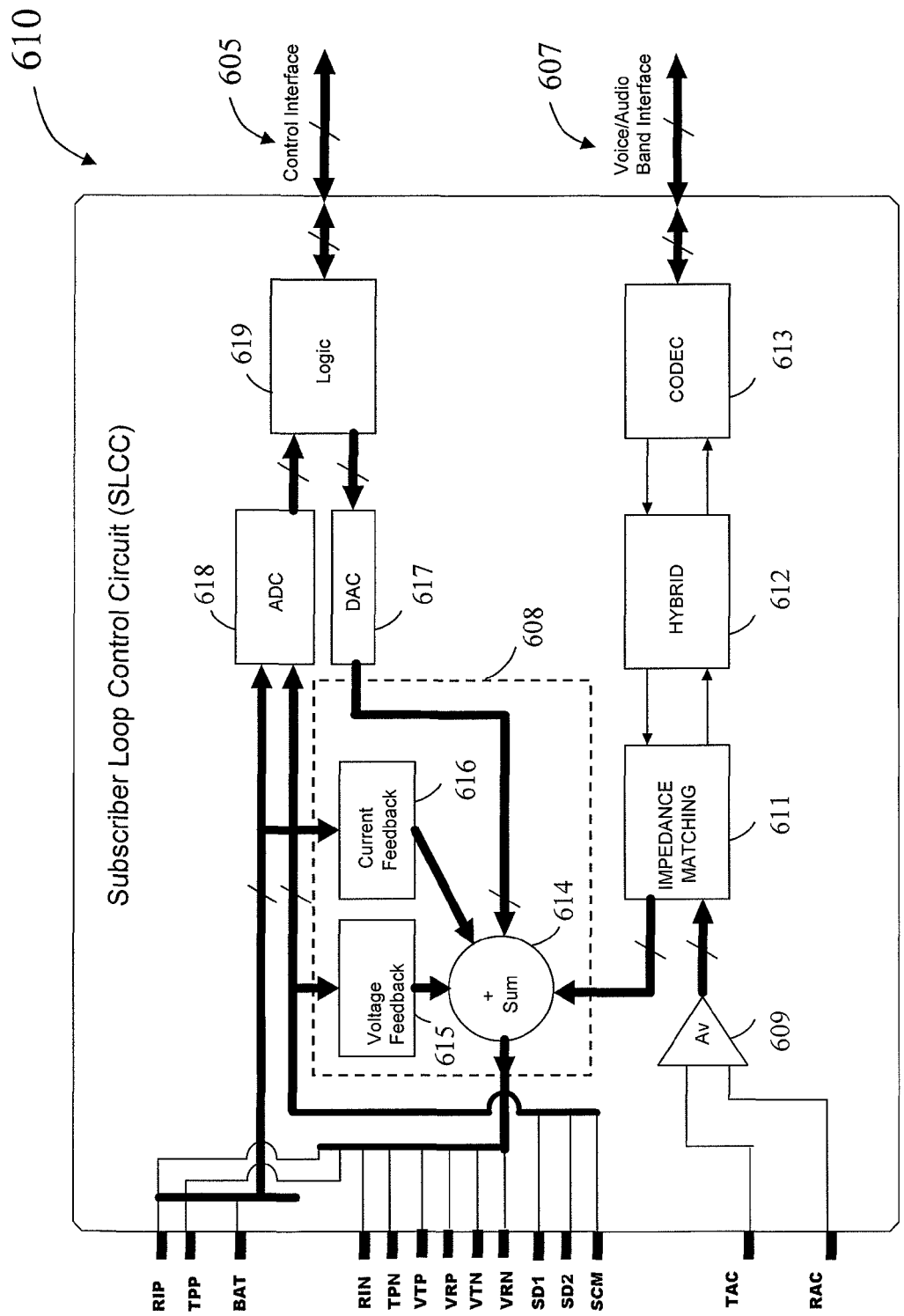
FIG. 6b is a simplified block diagram of a subscriber line control circuit (SLCC) according to another embodiment of the present invention.

FIG. 6b is a simplified block diagram of a subscriber line control circuit (SLCC) 610 according to an embodiment of the present invention. This diagram is merely an example, which should not unduly limit the scope of the claims herein. One of ordinary skill in the art would recognize other variations, modifications, and alternatives. As shown, the subscriber line control circuit 310 includes amplifier circuit 609, impedance matching circuit 611, hybrid circuit block 612, and programmable codec 613. In an embodiment, SLCC 610 also includes analog control circuit 608, digital-to-analog converter circuit (DAC) 617, analog-to-digital circuit (ADC) 618, and logic circuit 619. In a specific embodiment, analog control circuit 608 includes a summation circuit 614, analog voltage feedback circuit 615, and current feedback circuit 616. In an embodiment, the subscriber line control circuit 610 includes input terminals RAC and TAC for receiving voice band or audio band signals from the linefeed circuit 620. In some embodiments, these circuit blocks together implement many of the BORSCHT functions. For example, amplifier 609 receives AC voice band or audio band signals from the linefeed circuit 620. The impedance matching circuit 611 matches the characteristic impedance of the subscriber line. In an embodiment, the hybrid circuit 612 performs 2-wire to 4-wire conversion. The codec 613 performs coding and decoding functions for the voice or audio band signals. In a preferred embodiment, the SLCC is provided in a single integrated circuit chip. Of course, there can be other variations, modifications, and alternatives.

In a specific embodiment, SLCC 610 includes an input SCM for receiving the common mode signal $S_{COM}$ from the linefeed circuit, and also includes inputs SD1 and SD2 for receiving the differential mode signal $S_{DIFF}$ from the linefeed circuit. As shown in FIGS. 6a and 6b, the SLCC 610 is isolated from the tip signal TIP and the ring signal RING by the signal conversion circuit 623 in the linefeed circuit. In other words, SLCC 610 does not sense the tip signal or the ring signal according to embodiments of the present invention. In contrast, SLCC 610 receives a differential mode signal and a common mode signal, and can be relatively independent from the instabilities of the tip and ring signals.

As shown in FIG. 6b, in an embodiment, SLCC 610 includes output terminals VTP and VTN for providing tip control current signals. Similarly, SLCC 610 includes output terminals VRP and VRN for providing ring control current signals. These tip and ring control current signals are provided by the analog control circuit 608 in response to at least the common mode signal $S_{COM}$ and differential mode signal $S_{DIFF}$ from the linefeed circuit 620, and signals derived from the control interface 605 and voice/audio band interface 607. In an embodiment, the control interface 605 and the Voice band and/or audio band interface 607 are coupled to a digital communication network. For example, the digital communication network can be found in a central office of a telephone service provider, cable television networks, fiber optic, Ethernet port interface to the Internet, VoIP, or wireless local loop, etc. Of course, there can be other variations, modifications, and alternatives.

Referring back to FIG. 6a, in a specific embodiment, the tip control signals VTP and VTN are received by tip control circuit 621, which is coupled to the $N_{TIP}$ node for controlling the TIP signal line. The tip control circuit 621 includes transistors MT1, MT2, MT3, and MT4, and resistors RTP and RTN. In an embodiment, the tip control signals VTP and VTN are received at the gate terminal of transistor MT1 and the gate terminal of MT2, respectively. The tip control circuit 621 is also coupled to capacitor CTL for line capacitance compensation. In an embodiment, the subscriber line control circuit 610 includes output terminals VRP and VRN for providing ring control signals. In a specific embodiment, the ring control signals VRP and VRN are received by ring control circuit 622, which is coupled to the $N_{RING}$ node for controlling the RING signal line. In an embodiment, ring control circuit 622 includes transistors MR1, MR2, MR3, and MR4 and resistors RRP & RRN. In an embodiment, the ring control signals VRP and VRN are received at the gate terminal of transistor MR1 and the gate terminal of MR2, respectively. The ring control circuit 622 is also coupled to capacitors CRL for line capacitance compensation. In an embodiment, SLCC 610 includes a terminal BAT for communication with a VBAT signal through resistor R10. In an embodiment, VBAT is a supply voltage for the high voltage linefeed circuit. In an example, VBAT can be provided by an external power source. In another example, the SLCC includes an on-chip DCDC controller which can be used to control VBAT. As shown in FIG. 6a, VBAT is connected to resistor R10. Of course, there can be other variations, modifications, and alternatives.

In FIG. 6a, tip control signals VTP and VTN are received at the gate terminals of transistors MT1 and MT2, respectively, and ring control signals VRP and VRN are received at the gate terminals of transistors MR1 and MR2, respectively. This configuration allows tip control circuit 621 and ring control circuit 622 to operate in class AB. As a result, power consumption can be reduced in low signal or idle conditions. In an embodiment, transistors MT1 and MR1 are coupled to a reference voltage VREF through pull-up resistors RTP and RRP, respectively. And transistors MT2 and MR2 are coupled to reference voltage VREF through pull-up resistors RTN and RRN, respectively.

Additionally, in the example of FIG. 6a, MOSFETs MT3 and MT4 form a current mirror with an m:1 current ratio. With a given current ratio, the control circuitry can be simplified. For example, fewer control signals are needed, and pin counts can be reduced. Similar advantages can be achieved with MOSFETs MR3 and MR4 forming a current mirror with an m:1 current ratio. The value for m can be selected to suit different applications. For example, in various embodiments, m can be 10 to 100.

In some embodiments, a portion of linefeed circuit 620 may be integrated into an integrated circuit chip. As shown in FIG. 6a, a subscriber linefeed circuit (SLFC) 625 includes MOSFET transistors MT1-MT4 of tip control circuit 621, MOSFET transistors MR1-MR4 of ring control circuit 622, and MOSFET transistors MD1-MD6 of signal conversion circuit 623.

According to embodiments of the present invention, subscriber line interface circuit (SLIC) 600 can be implemented in various circuit configurations. For example, in a specific embodiment, subscriber line control circuit (SLCC) 610 is implemented in an integrated circuit, and linefeed circuit 620 may be implemented using discrete components. In another embodiment, the SLCC is implemented in an integrated circuit, and the linefeed circuit is implemented in a second integrated circuit. For example, the SLCC can be implemented in a CMOS integrated circuit. In another example, the linefeed circuit can be implemented in a bipolar, CMOS, BiCMOS or DMOS integrated circuit. In an alternative embodiment, the SLCC and the linefeed circuit are implemented in a single integrated circuit, e.g. a BiCMOS integrated circuit. Of course, there can be other variations, modifications, and alternatives.

Although the above has been shown using a selected group of components for the subscriber line interface circuit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and the drawings.

Figure 7:
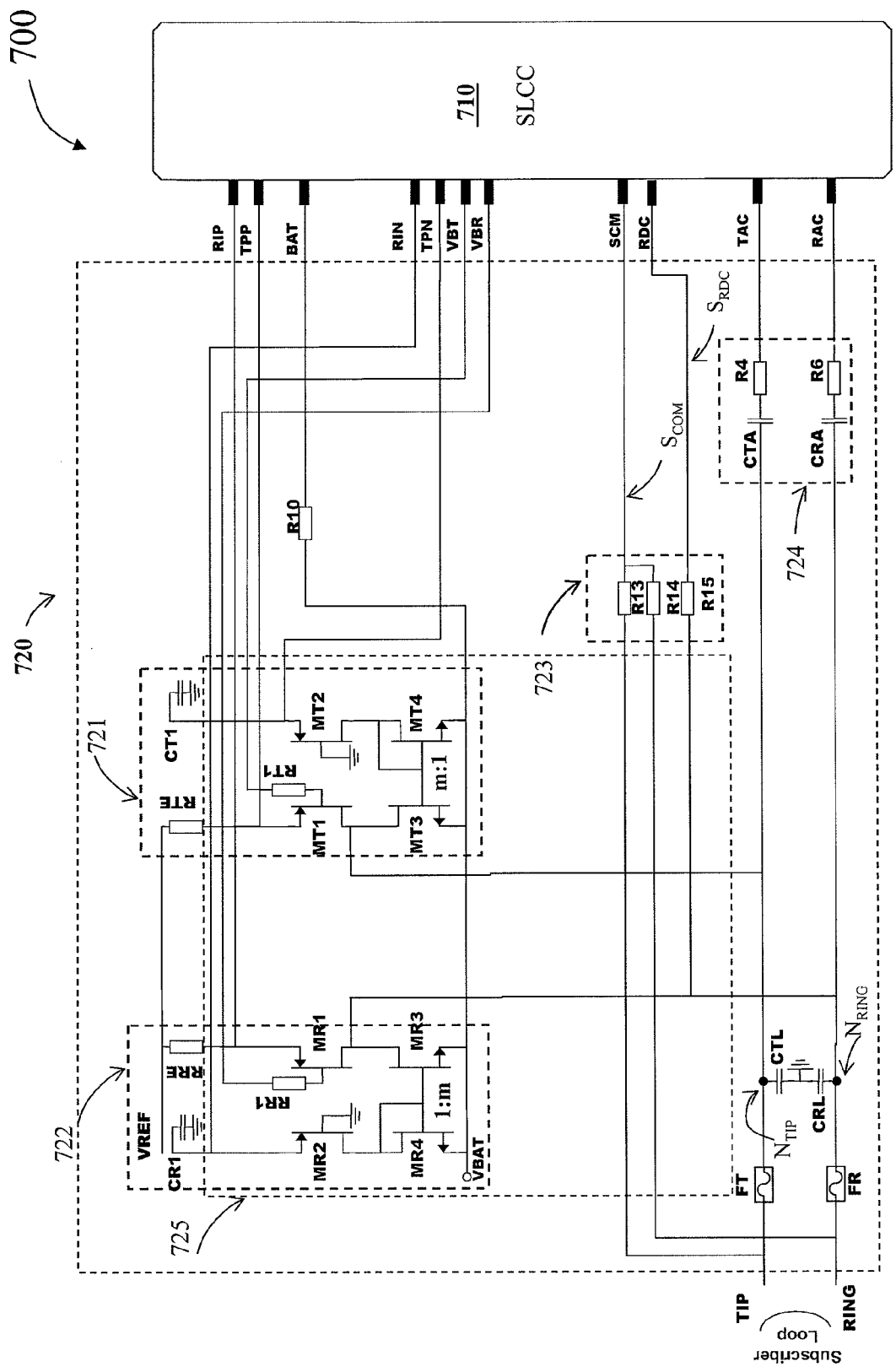
FIG. 7 is a simplified block diagram of a subscriber line interface circuit (SLIC) according to an alternative embodiment of the present invention.

FIG. 7 is a simplified block diagram of a subscriber line interface circuit (SLIC) 700 according to yet another embodiment of the present invention. This diagram is merely an example, which should not unduly limit the scope of the claims herein. One of ordinary skill in the art would recognize other variations, modifications, and alternatives. As shown, SLIC circuit 400 includes a subscriber loop control circuit (SLCC) 710 and a linefeed circuit 720. The linefeed circuit 720 includes TIP control circuit 721, RING control circuit 722, a signal conversion circuit 723, and a filter circuit 724. In an embodiment, linefeed circuit 720 includes circuit nodes $N_{TIP}$ and $N_{RING}$. Node $N_{TIP}$ is coupled to a signal line to receive a tip signal TIP from the subscriber loop. Node $N_{RING}$ is coupled to a second signal line to receive a ring signal RING from the subscriber loop. As shown in FIG. 7, signal conversion circuit 723 provides a common mode signal $S_{COM}$ and direct coupled ring signal $S_{RDC}$ in response to the tip signal TIP and the ring signal RING of the subscriber loop. In an embodiment, the common-mode signal $S_{COM}$ is coupled with the TIP signal through resistor R13, and $S_{COM}$ is coupled with the RING signal through resistor R14. In a specific embodiment, the common-mode signal $S_{COM}$ is proportional to a sum of the subscriber loop tip and ring voltages. In an embodiment, direct coupled ring signal $S_{RDC}$ is derived from the $N_{RING}$ signal through resistors R15 as shown in FIG. 7. In a specific embodiment, subscriber line control circuit (SLCC) 710 includes an input RDC configured to receive the direct coupled ring signal $S_{RDC}$ from the linefeed circuit. Of course, there can be other variations, modifications, and alternatives.

As shown in FIG. 7, linefeed circuit 720 includes a filter circuit 724, which includes capacitor CRA and resistor R6 connected in series to provide an AC ring signal to input terminal RAC of SLCC 710. Similarly, filter circuit 724 includes capacitor CTA and resistor R4 connected in series to provide an AC tip signal to input terminal TAC of SLCC 710. In an embodiment, the AC tip and ring signals include voice/audio band signals.

In a specific embodiment, SLCC 710 includes an input SCM for receiving the common mode signal $S_{COM}$ from the linefeed circuit and input RDC for receiving the direct coupled ring signal $S_{RDC}$ from the linefeed circuit. As shown in FIG. 7, in an embodiment, SLCC 710 includes output terminals VBT and TPN for providing tip control current signals. Similarly, SLCC 710 includes output terminals VBR and RIN for providing ring control current signals. These tip and ring control current signals are provided by an analog control circuit (not shown) in response to at least the common mode signal $S_{COM}$ and the direct coupled ring signal $S_{RDC}$ from the linefeed circuit 720. In a specific embodiment, SLCC 710 also includes circuit blocks not shown in FIG. 7, such as analog control circuit, analog-to-digital converter, logic circuit, amplifier circuit, impedance matching circuit, hybrid circuit, and codec circuit. For example the amplifier receives AC voice band or audio band signals from the linefeed circuit. The impedance matching circuit matches the characteristic impedance of the signals to and from the linefeed circuit. The hybrid circuit performs 2-wire to 4-wire conversion. The codec performs signal conversion for the voice or audio band. In an embodiment, these circuit blocks together implements many of the BORSCHT functions. Of course, there can be other variations, modifications, and alternatives.

In FIG. 7, in a specific embodiment, the tip control signals VBT and TPN are received by tip control circuit 721, which is coupled to the $N_{TIP}$ node for controlling the TIP signal line. The tip control circuit 721 includes transistors MT1, MT2, MT3 and MT4, capacitor CT1, and resistor RT1. In an embodiment, the tip control signals VBT and TPN are received at the gate terminal of transistor MT1 and the source terminal of MT2, respectively. The tip control circuit 721 is also coupled to capacitors CTL for line capacitance compensation. In an embodiment, the subscriber line control circuit 710 includes output terminals VBR and RIN for providing ring control signals. In a specific embodiment, the ring control signals VBR and RIN are received by ring control circuit 722, which is coupled to the $N_{RING}$ node for controlling the RING signal line. In an embodiment, ring control circuit 722 includes transistors MR1, MR2, MR3 and MR4, capacitor CR1, and resistor RR1. In an embodiment, the ring control signals VBR and RIN are received at the gate terminal of transistor MR1 and the source terminal of MR2, respectively. The ring control circuit 722 is also coupled to capacitors CRL for line capacitance compensation. In an embodiment, SLCC 710 includes a terminal BAT for communication with a VBAT signal through resistor R10. In an embodiment, VBAT is a supply voltage for the high voltage linefeed circuit. In an example, VBAT can be provided by an external power source. In another example, the SLCC includes an on-chip DCDC controller which can be used to control VBAT. As shown in FIG. 7, VBAT is connected to resistor R10. Of course, there can be other variations, modifications, and alternatives.

Additionally, in the example of FIG. 7, MOSFETs MT3 and MT4 form a current mirror with an m:1 current ratio. With a given current ratio, the control circuitry can be simplified. For example, fewer control signals are needed, and pin counts can be reduced. Similar advantages can be achieved with MOSFETs MR3 and MR4 forming a current mirror with an m:1 current ratio. The value for m can be selected to suit different applications. For example, in various embodiments, m can be 10 to 100.

In some embodiments, a portion of linefeed circuit 720 may be integrated into an integrated circuit chip. As shown in FIG. 7, a subscriber linefeed circuit (SLFC) 725 includes MOSFET transistors MT1-MT4 of tip control circuit 721, MOSFET transistors MR1-MR4 of ring control circuit 722, and MOSFET transistors MD1-MD6 of signal conversion circuit 723.

According to embodiments of the present invention, a subscriber line interface circuit (SLIC), e.g. 700, can be implemented in various circuit configurations. For example, on a specific embodiment, a subscriber line control circuit (SLCC), such as 710, is implemented in an integrated circuit and a linefeed circuit, such as 720, may be implemented using discrete components. In another embodiment, the subscriber line control circuit is implemented in an integrated circuit and the linefeed circuit is implemented in a second integrated circuit. For example, the subscriber line control circuit can be implemented in a CMOS integrated circuit. In another example, the linefeed circuit can be implemented in a bipolar, CMOS, BiCMOS, or DMOS integrated circuit. In an alternative embodiment, the subscriber line control circuit and the linefeed circuit are implemented in a single integrated circuit, e.g. a BiCMOS integrated circuit. Of course, there can be other variations, modifications, and alternatives.

Although the above has been shown using a selected group of components for the subscriber line interface circuit, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

It is also understood that the examples and embodiments described herein are for illustrative purposes only and that various modifications or changes in light thereof will be suggested to persons skilled in the art and are to be included within the spirit and purview of this application.

What is claimed is:

1. A subscriber line interface circuit apparatus for a subscriber loop, the apparatus comprising:
   a linefeed circuit, the linefeed circuit including:
   a first node coupled to a first signal line to receive a tip signal from the subscriber loop;
   a second node coupled to a second signal line to receive a ring signal from the subscriber loop;

a signal conversion circuit coupled to the first node and the second node for receiving the tip signal and the ring signal, the signal conversion circuit having cross-coupled first and second MOSFETs for providing a differential mode signal and a common mode signal in response to at least the tip signal and the ring signal, wherein the differential mode signal is associated with a difference between the tip signal and the ring signal, and the common mode signal is associated with a sum of the tip signal and the ring signal;

a filter circuit coupled to the signal conversion circuit, the filter circuit configured for providing audio band or voice band signals;

a tip control circuit coupled to the first node, the tip control circuit having two or more MOSFETs for providing a tip output signal to the first signal line in response to a first tip control signal and a second tip control signal; and a ring control circuit coupled to the second node, the ring control circuit having two or more MOSFETs for providing a ring output signal to the second signal line in response to at least a first ring control signal and a second ring control signal;
and a subscriber line control circuit, the subscriber line control circuit being provided in a single integrated circuit chip and isolated from the first and second signal lines, the subscriber line control circuit including:

first and second differential mode inputs for receiving the differential mode signal from the linefeed circuit;

a common mode input for receiving the common mode signal from the linefeed circuit;

an analog to digital converter circuit coupled to the common mode input and the differential mode inputs;

an analog control circuit coupled to the common mode input and the differential mode inputs, the analog control circuit providing the first tip control signal, the second tip control signal, the first ring control signal, and the second ring control signal, in response to at least the common mode signal and the differential mode signal;

a first tip control output and a second tip control output coupled to the analog control circuit, the first tip control output and the second tip control output providing the first tip control signal and the second tip control signal, respectively;

a first ring control output and a second ring control output coupled to the analog control circuit for providing the first ring control signal and the second ring control signal, respectively;

an amplifier circuit for receiving the audio band or voice band signals from the linefeed circuit;

an impedance matching circuit coupled to the amplifier circuit, the impedance matching circuit being configured for the subscriber line control circuit to match a characteristic line impedance of the subscriber loop;

a hybrid circuit coupled to the impedance matching circuit; and a codec, the codec coupled to the hybrid circuit.

2. The subscriber line interface circuit apparatus of claim 1 wherein the signal conversion circuit comprises a first MOSFET transistor and a second MOSFET transistor, wherein:

a first terminal of the first MOSFET transistor is coupled to the first node;

a second terminal of the first MOS transistor is coupled to the second node;

a third terminal of the first MOSFET transistor is in communication with a first differential mode signal line;

a first terminal of the second MOSFET transistor is coupled to the second node;

a second terminal of the second MOSFET transistor is coupled to the first node; and a third terminal of the second MOSFET transistor is in communication with a second differential mode signal line;

the first and the second differential mode signal lines providing the differential mode signal.

3. The subscriber line interface circuit apparatus of claim 2 wherein the signal conversion circuit further comprises a first resistor and a second resistor, wherein:

a first terminal of the first resistor is coupled to the first node;

a second terminal of the first resistor is coupled to the common mode signal;

a first terminal of the second resistor is coupled to the second node; and a second terminal of the second resistor is coupled to the common mode signal.

4. The subscriber line interface circuit apparatus of claim 1 wherein the tip control circuit comprises a first tip control MOSFET transistor and a second tip control MOSFET transistor, wherein:

a gate terminal of the first tip control MOSFET transistor is in communication with the first tip control signal;

a source terminal of the second tip control MOSFET transistor is in communication with the second tip control signal; and the first and the second tip control MOSFET transistors are coupled to a first current mirror circuit.

5. The subscriber line interface circuit apparatus of claim 4 wherein the first current mirror has a current ratio of 1:m, where m is between about 10 to about 100.

6. The subscriber line interface circuit apparatus of claim 4 wherein:

the first tip control MOSFET transistor is coupled to a reference voltage through a first pull-up resistor; and the second tip control MOSFET transistor is coupled to the reference voltage through a second pull-up resistor, a gate terminal of the second tip control MOSFET transistor being in communication with a third tip control signal.

7. The subscriber line interface circuit apparatus of claim 1 wherein the ring control circuit includes a first ring control MOSFET transistor and a second ring control MOSFET transistor, wherein:

a gate terminal of the first ring control MOSFET transistor is in communication with the first ring control signal;

a source terminal of the second ring control MOSFET transistor is in communication with the second ring control signal; and the first and the second ring control MOSFET transistors are coupled to a second current mirror circuit.

8. The subscriber line interface circuit apparatus of claim 7 wherein the second current mirror has a current ratio of 1:m, where m is between about 10 to about 100.

9. The subscriber line interface circuit apparatus of claim 7 wherein:

the first ring control MOSFET transistor is coupled to a reference voltage through a third pull-up resistor; and the second ring control MOSFET transistor is coupled to the reference voltage through a fourth pull-up resistor, a gate terminal of the second ring control MOSFET transistor being in communication with a third ring control signal.

10. The subscriber line interface circuit apparatus of claim 1 wherein the ring control circuit and the tip control circuit are configured to receive control signals for class AB amplifier operations from the subscriber line control circuit.

11. The subscriber line interface circuit apparatus of claim 1 wherein the linefeed circuit comprises discrete components.

12. The subscriber line interface circuit apparatus of claim 1 wherein the linefeed circuit is implemented in an integrated circuit.

13. A subscriber line interface circuit apparatus for a subscriber loop, the apparatus comprising:
a linefeed circuit, having:
cross-coupled first and second MOSFETs for providing a differential mode signal;
two or more of MOSFETs for receiving a tip control signal at a gate terminal and providing a tip output signal; and
two or more MOSFETs for receiving a ring control signal at a gate terminal and providing a ring output signal;
wherein the linefeed circuit is configured for providing the differential mode signal and a common mode signal in response to at least a tip signal and a ring signal from the subscriber loop, wherein the differential mode signal is associated with a difference between the tip signal and the ring signal of the subscriber loop, and the common mode signal is associated with a sum of the tip signal and the ring signal of the subscriber loop, and the linefeed circuit is also configured for providing the tip output signal and the ring output signal to the subscriber loop in response to one or more ring control signals and one or more tip control signals; and
a subscriber line control circuit coupled to the linefeed circuit for receiving the differential mode signal and the common mode signal from the linefeed circuit, the subscriber line control circuit being configured for providing the one or more ring control signals and the one or more tip control signals to the linefeed circuit.

14. The subscriber line interface circuit apparatus of claim 13 wherein the one or more ring control signals include at least a ring control current signal, and the one or more tip control signals include at least a tip control current signal.

15. The subscriber line interface circuit apparatus of claim 13 wherein the one or more ring control signals include at least a ring control voltage signal, and the one or more tip control signals include at least a tip control voltage signal.

16. The subscriber line interface circuit apparatus of claim 13 wherein the linefeed circuit comprises:
a first node, the first node being coupled to a first signal line to receive a tip signal from the subscriber loop;
a second node, the second node being coupled to a second signal line to receive a ring signal from the subscriber loop;
a signal conversion circuit having the cross-coupled first and second MOSFETs, the signal conversion circuit being coupled to the first node and the second node to receive the tip signal and the ring signal, respectively, the signal conversion circuit providing a differential mode signal and a common mode signal in response to at least the tip signal and the ring signal;
a filter circuit, the filter circuit being coupled to the signal conversion circuit, the filter circuit providing audio band or voice band signals;
a tip control circuit, the tip control circuit being coupled to the first node, the tip control circuit providing a tip output signal to the first signal line in response to a first tip control current signal and a second tip control current signal; and
a ring control circuit coupled to the second node, the ring control circuit providing a ring output signal to the second signal line in response to a first ring control current signal and a second ring control current signal.

17. The subscriber line interface circuit apparatus of claim 13 wherein the ring control circuit and the tip control circuit are configured to receive control signals for class AB amplifier operations from the subscriber line control circuit.

18. The subscriber line interface circuit apparatus of claim 13 wherein the subscriber line control circuit comprises:
a first and a second differential mode input, the first and second differential mode inputs receiving the differential mode signal from the linefeed circuit;
a common mode input, the common mode input receiving the common mode signal from the linefeed circuit;
an analog to digital converter circuit, the analog to digital converter circuit being coupled to the common mode input and the differential mode inputs;
an analog control circuit, the analog control circuit being coupled to the common mode input and the differential mode inputs, the analog control circuit providing the first tip control current signal, the second tip control current signal, the first ring control current signal, and a second ring control current signal in response to at least the common mode signal and the differential mode signal;
a first tip control output and a second tip control output coupled to the analog control circuit, the first tip control output and second tip control output providing the first tip control current signal and the second tip control current signal, respectively;
a first ring control output and a second ring control output coupled to the analog control circuit, the first ring control output and second ring control output providing the first ring control current signal and the second ring control current signal, respectively;
an amplifier circuit for receiving the audio band or voice band signals from the linefeed circuit;
an impedance matching circuit, the impedance matching circuit being coupled to the amplifier circuit, the impedance matching circuit being configured for the subscriber line control circuit to match a characteristic line impedance of the subscriber loop;
a hybrid circuit, the hybrid circuit being coupled to the impedance matching circuit; and
a codec, the codec being coupled to the hybrid circuit;
wherein the subscriber line control circuit is provided in a single integrated circuit chip.

19. The subscriber line interface circuit apparatus of claim 13 wherein the linefeed circuit comprises discrete components.

20. The subscriber line interface circuit apparatus of claim 13 wherein the linefeed circuit is implemented in an integrated circuit.

21. A subscriber line interface circuit apparatus for a subscriber loop, the apparatus comprising a linefeed circuit and a subscriber line control circuit,
the linefeed circuit including:

a first node coupled to a first signal line to receive a tip signal from the subscriber loop;

a second node coupled to a second signal line to receive a ring signal from the subscriber loop;

a signal conversion circuit coupled to the first node and the second node for receiving the tip signal and the ring signal, respectively, the signal conversion circuit providing a common mode signal in response to at least the tip signal and the ring signal, wherein the common mode signal is associated with a sum of the tip signal and the ring signal of the subscriber loop, the signal conversion circuit also providing a DC ring signal;

a filter circuit, the filter circuit being coupled to the signal conversion circuit, the filter circuit providing audio band or voice band signals;

a tip control circuit coupled to the first node, the tip control circuit having two or more MOSFETs for providing a tip output signal to the first signal line in response to a tip control voltage signal and a tip control current signal; and a ring control circuit coupled to the second node, the ring control circuit the ring control circuit having two or more MOSFETs for providing a ring output signal to the second signal line in response to a ring control voltage signal and a ring control current signal;

and the subscriber line control circuit including:

a common mode input and a DC ring signal input, the common mode input receiving the common mode signal from the linefeed circuit and the DC ring signal input receiving the DC ring signal from the linefeed input;

an analog control circuit, the analog control circuit being coupled to the common mode input and the DC ring signal input, the analog control circuit providing the tip control voltage signal, the tip control current signal, the ring control voltage signal, and ring control current signal in response to at least the common mode signal and the DC ring signal;

an amplifier circuit for receiving the audio band or voice band signals from the linefeed circuit; and a codec, the codec being coupled to the amplifier circuit;

wherein the subscriber line control circuit is provided in a single integrated circuit chip.

22. The subscriber line interface circuit apparatus of claim 21 wherein the subscriber line control circuit further comprises:

an analog to digital converter circuit, the analog to digital converter circuit being coupled to the common mode input and the DC ring input;

a first tip control output and a second tip control output coupled to the analog control circuit, the first tip control output and the second tip control output providing the tip control voltage signal and the tip control current signal, respectively; and a first ring control output and a second ring control output coupled to the analog control circuit, the first ring control output and second ring control output providing the ring control voltage signal and the ring control current signal, respectively.

23. The subscriber line interface circuit apparatus of claim 21 wherein the signal conversion circuit further comprises a first resistor and a second resistor, wherein:

a first terminal of the first resistor is coupled to the first node;

a second terminal of the first resistor is coupled to the common mode signal;

a first terminal of the second resistor is coupled to the second node; and a second terminal of the second resistor is coupled to the common mode signal.

24. The subscriber line interface circuit apparatus of claim 21 wherein the tip control circuit comprises a first tip control MOSFET transistor and a second tip control MOSFET transistor, a source terminal of each of the first tip control MOSFET transistor and the second tip control MOSFET transistor being in communication with the tip control voltage signal and the tip control current signal, respectively.

25. The subscriber line interface circuit apparatus of claim 21 wherein the ring control circuit includes a first ring control MOSFET transistor and a second ring control MOSFET transistor, a source terminal of each of the first ring control MOSFET transistor and second ring control MOSFET transistor being in communication with the ring control voltage signal and the ring control current signal, respectively.

26. The subscriber line interface circuit apparatus of claim 21 wherein the linefeed circuit comprises discrete components.

27. The subscriber line interface circuit apparatus of claim 21 wherein the linefeed circuit is implemented in an integrated circuit.

* * * * *